United States Patent
Itoi et al.

(10) Patent No.: US 8,239,296 B2
(45) Date of Patent: Aug. 7, 2012

(54) SYSTEM AND METHOD OF ASSISTING GOODS COLLECTION AND RECORDING MEDIUM

(75) Inventors: Yoshio Itoi, Kanagawa (JP); Takashige Sudo, Kanagawa (JP); Shigeru Shimomura, Kanagawa (JP)

(73) Assignees: Ricoh Company, Ltd., Tokyo (JP); Canon Sales Co., Inc., Chiba-shi (JP); Fuji Xerox Co., Ltd., Tokyo (JP); Japan Business Machine Makers Association, Tokyo (JP)

( * ) Notice: Subject to any disclaimer, the term of this patent is extended or adjusted under 35 U.S.C. 154(b) by 1183 days.

(21) Appl. No.: 11/619,509

(22) Filed: Jan. 3, 2007

(65) Prior Publication Data

US 2007/0124221 A1    May 31, 2007

Related U.S. Application Data

(63) Continuation of application No. 10/028,793, filed on Dec. 28, 2001, now abandoned.

(30) Foreign Application Priority Data

Dec. 28, 2000 (JP) ................................ 2000-402196

(51) Int. Cl.
*A01K 5/02* (2006.01)

(52) U.S. Cl. ........... 705/29; 705/7.12; 705/28; 235/375; 235/376

(58) Field of Classification Search .................. None
See application file for complete search history.

(56) References Cited

U.S. PATENT DOCUMENTS

| 5,965,858 A * | 10/1999 | Suzuki et al. ................ 235/375 |
| 6,516,280 B2 * | 2/2003 | Haraburda et al. ............ 702/82 |
| 2002/0010634 A1 * | 1/2002 | Roman et al. ................... 705/26 |
| 2002/0013744 A1 | 1/2002 | Tsunenari et al. |

FOREIGN PATENT DOCUMENTS

| JP | 5-342224 | 12/1993 |
| JP | 7-334583 | 12/1995 |

(Continued)

OTHER PUBLICATIONS

"Reloop: Reverse Logistics Chain Optimization in a Multi-User Trading Environment", Bettac, E.; Maas, K.; Beullens, P.; Bopp, R., IEEE, 1999 pp. 42-47.*
K. Mugita, Logistics Systems, vol. 9, No. 8, pp. 59-63, "Eco-Business and Reverse Logistics", Nov. 30, 2000.
M. Hori, Logistics Information, pp. 9-13, "The Current Situation of Eco-Business in the Logistics Industry the Trend and Problems of the Main Line Logistics", Sep. 2001.

(Continued)

*Primary Examiner* — M. Thein
(74) *Attorney, Agent, or Firm* — Oblon, Spivak, McClelland, Maier & Neustadt, L.L.P.

(57) ABSTRACT

An exchange assisting system is provided in an exchange center. Each maker who trades in used goods, such as copying machines, for new ones from a business entity brings goods produced by other makers into the exchange center. The system manages the inventory information of goods delivered from each maker and stored in the exchange center. The system prepares inventory information on goods maker by maker every given period and sends the information to each maker on-line. Each maker prepares list data of goods the maker wants to collect based on the inventory information and sends the list data to the exchange assisting system online. The exchange assisting system prepares delivering-out information for delivering goods out of the exchange center based on the desired goods-to-ship data and outputs the information as one needed to ship associated goods to each maker.

18 Claims, 36 Drawing Sheets

FOREIGN PATENT DOCUMENTS

| | | |
|---|---|---|
| JP | 11-70378 | 3/1999 |
| JP | 2000-289807 | 10/2000 |
| JP | 2001-225922 | 8/2001 |
| JP | 2001-229280 | 8/2001 |
| JP | 2001-276797 | 10/2001 |
| JP | 2001-306685 | 11/2001 |
| JP | 2002-149911 | 5/2002 |
| JP | 2002-166258 | 6/2002 |
| JP | 2002-249226 | 9/2002 |

OTHER PUBLICATIONS

M. Otsuka, Logistics System, vol. 10, No. 8, pp. 77-83, "Approach to Recycle Logistics Associated With the Environment", Nov. 30, 2001.

I. Kikuta, Material Flow, No. 471, pp. 57-64, "Promote Re-Use by Self-Cleaning Glass Bottles and P-Boxes", Jun. 1999.

* cited by examiner

FIG. 4

| SCHEDULED STORING DATE | MAKER | MACHINE TYPE | MACHINE NAME | MODEL NO. | QUANTITY |
|---|---|---|---|---|---|
| 12/14 | COMPANY B | COPYING MACHINE | BXXXX | 123456X | 10 |
| 12/14 | COMPANY C | COPYING MACHINE | CXXXX | 654321C | 5 |
| 12/15 | COMPANY B | COLOR COPYING MACHINE | BXXXX | 012345Z | 5 |
| …… | …… | …… | …… | …… | …… |

| MACHINE TYPE | MACHINE NAME | MODEL NO. | QUANTITY |
|---|---|---|---|
| COPYING MACHINE | BXXXX | 123456X | 40 |
| COLOR COPYING MACHINE | BXXXX | 012345Z | 15 |
| ...... | ...... | ...... | ...... |

FIG. 6

| SCHEDULED SHIPPING DATE | MODEL NO. | QUANTITY |
|---|---|---|
| 12/19 | 123456X | 40 |
| 12/19 | 012345Z | 15 |
| ....... | ...... | .... |

*FIG. 7*

| SCHEDULED SHIPPING DATE | MAKER | MACHINE TYPE | MACHINE NAME | MODEL NO. | QUANTITY | BLOCK |
|---|---|---|---|---|---|---|
| 12/19 | COMPANY B | COPYING MACHINE | BXXXX | 123456X | 40 | 25F |
| 12/19 | COMPANY B | COLOR COPYING MACHINE | BXXXX | 0123457 | 15 | 25G |
| ...... | ...... | ...... | ...... | ...... | ...... | ...... |

*FIG. 8*

| ID | PASSWORD | COMPANY NAME | BRANCH NO. | POST (DEPARTMENT NAME) |
|---|---|---|---|---|
| | | | ⋮ | ⋮ |
| | | | BRANCH NO. | POST (DEPARTMENT NAME) |

*FIG. 13A*

| MANAGEMENT NO. | DESIRED CARRY-IN DATE | ACTUAL CARRY-IN DATE | CARRY-IN COMPANY | DISTRIBUTION MEANS |
|---|---|---|---|---|
| CARRY-IN DEALER | MAKER NAME FOR CARRIED-IN MACHINE | COMPANY CODE | PRODUCT NAME | CLASSIFICATION |
| QUANTITY | MEMO | SCHEDULED TRANSPORTING DATE | ACTUAL TRANSPORTING DATE | OTHER |

*FIG. 13B*

| MANAGEMENT NO. (DEPOT) | DESIRED CARRY-IN DATE | ACTUAL CARRY-IN DATE | CARRY-IN COMPANY | DISTRIBUTION MEANS |
|---|---|---|---|---|
| CARRY-IN DEALER | MAKER NAME FOR CARRIED-IN MACHINE | ACTUAL CARRY-IN DATE | PRODUCT NAME | CLASSIFICATION |
| QUANTITY | MEMO | SCHEDULED TRANSPORTING DATE | ACTUAL TRANSPORTING DATE | OTHER |
| MANAGEMENT NO. (CENTER) | SCHEDULED TRANSPORTING DATE | ACTUAL TRANSPORTING DATE | MACHINE NO. | COUNTER |
| VOLUME CLASSIFICATION | INCIDENTAL EXPENSE (1) | INCIDENTAL EXPENSE (2) | INCIDENTAL EXPENSE (3) | INCIDENTAL EXPENSE (4) |
| INCIDENTAL EXPENSE (5) | SCHEDULED SHIPPING DATE | ACTUAL SHIPPING DATE | OTHER | |

FIG. 13C

PROCESS SELECTION SCREEN

LOG OUT
COMPANY CODE XXXXXXX
COMPANY NAME XXXXXXX

PLEASE SELECT ONE OF FOLLOWING EVENTS

BUSINESS SYSTEM OF EACH DISTRIBUTION BASE

| ARRANGEMENT FOR CARRYING IN COLLECTED MACHINES OF OTHER COMPANIES | ARRANGEMENT FOR RECEIVING COLLECTED MACHINES OF OUR COMPANY |
|---|---|

BUSINESS SYSTEM OF MANAGEMENT DEPARTMENT OF EACH COMPANY

| ANALYSIS OF DETAILED DATA ON VEIN DISTRIBUTION | RETRIEVE MONTHLY ACHIEVEMENT AND DETAILED COST STATEMENT |
|---|---|

BUSINESS SYSTEM OF COLLECTION DEPOT AND EXCHANGE CENTER

| REGISTRATION FOR RECEIVING COLLECTED MACHINES | DEPOT-CENTER TRANSPORTING REPORT | CENTER INVENTORY REPORT |
|---|---|---|
| ARRANGEMENT FOR DELIVERING OUT COLLECTED MACHINES | MAKING OF MONTHLY ACHIEVEMENT REPORT | TOTALING OF BILL DATA |

COMMON BUSINESS SYSTEM

| RETRIEVE STATUS OF COLLECTED MACHINES IN STOCK | RETRIEVE STATUS INFORMATION | SECURITY CONTROL |
|---|---|---|

ENTRY DATE:2002.01.07

COLLECTED-MACHINE CARRY-IN REQUEST

CARRY-IN PLACE: ** COLLOECTION DEPOT
IN CHARGE **
--**

CARRY-IN COMPANY NAME:
** BUSINESS MACHINE CO.
--**

COMPANY CODE(JBMA003)

| DISTRIBUTION MEANS | OWN TRANSPORTATION | O | DESIRED CARRY-IN DATE:2002.01.08 | TRANSPORTER: **TRANSPORT CO. |
|---|---|---|---|---|
| | REQUEST DELIVERLY | | DESIRED COLLOECTION DATE: | |

| MAKER OF CARRIED-IN PRODUCT | PRODUCTS | PRODUCT CLASS. | | | QT. | MAKER'S NOTE |
| --- | --- | --- | --- | --- | --- | --- |
| | | MACHINE | ACCE. | EXPEND. | | |
| COMPANY A (JBMA005) | V550 | O | | | 1 | |
| COMPANY A (JBMA005) | V550 | O | | | 1 | PANEL DAMAGED |
| COMPANY A (JBMA005) | V400 | O | | | 1 | |
| COMPANY A (JBMA005) | SORTER | | O | | 1 | |
| COMPANY A (JBMA005) | TONER CARTRIDGE | | | O | 3 | |
| COMPANY C (JBMA001) | GT200 | O | | | 1 | |
| COMPANY B (JBMA002) | NP2020 | O | | | 1 | |
| TOTAL | — | 5 | 1 | 3 | 9 | |

NOTE: ETA IS ABOUT 18:00

*FIG. 19*

LIST OF COLLECTED-MACHINE CARRY-IN REQUESTS

<<BACK 1 2 3 4 5 6 7 8 9 10 NEXT>>

| REGISTRATION | CARRY-IN | BRANCH NO. | DESIRED CARRY-IN/ | |
|---|---|---|---|---|
| 2001.09.21 | COMPANY A | EDOI001 | 2001.09.22 | ☐ |
| 2001.09.20 | COMPANY B | EDOI002 | 2001.09.21 | ☐ |
| 2001.09.19 | COMPANY C | EDOI003 | 2001.09.20 | ☐ |
| 2001.09.18 | COMPANY D | EDOI004 | 2001.09.19 | ☒ |
| 2001.09.17 | COMPANY E | EDOI005 | 2001.09.18 | ☒ |
| 2001.09.16 | COMPANY F | EDOI006 | 2001.09.17 | ☒ |

CHECK – INPUT FOR COLLECTED MACHINE CARRY-IN

CHECK – INPUT FOR COLLECTED MACHINE CARRY-IN    LOG OUT

COMPANY CODE XXXXXXXX
COMPANY NAME   XXXXXXXXX

CARRY-IN PLACE

| NAME | ****** | CODE | **** |
|---|---|---|---|
| ADDRESS | ****** | | |
| IN CHARGE | ****** | | |
| TEL | --** | | |

CARRY-IN COMPANY SETTING

| COMPANY | ****** |
|---|---|
| SECT. | ****** |
| ADDRESS | ****** |
| IN CHARGE | ****** |
| TEL | --** |

| COMPANY CODE | BRANCH NO. |
|---|---|
| **** | ***** |

| NOTE | ******* |
|---|---|

DISTRIBUTION   DESIRED DATE: 2001.09.22
XXXXX

| DEALER | ****** |
|---|---|
| TEL | --** |

| MAKER OF CARRIED-IN MACHINE | COMPANY CODE | PRODUCTS | CLASS. | QT. | NOTE |
|---|---|---|---|---|---|
| **** | **** | *** | MACHINE | 1 | ***** |

[ SETTLE ]   [ BACK ]

FIG. 22

CHECK – INPUT FOR COLLECTED MACHINE CARRY-IN

CHECK – INPUT FOR COLLECTED MACHINE CARRY-IN                    LOG OUT

COMPANY CODE XXXXXXXXX
COMPANY NAME   XXXXXXXXX

CARRY-IN PLACE

| NAME | ***** | CODE | **** |
|---|---|---|---|
| ADDRESS | ***** | | |
| IN CHARGE | ***** | | |
| TEL | --** | | |

DISTRIBUTION   DESIRED DATE: 2001.09.22
XXXXX

| DEALER | ***** |
|---|---|
| TEL | --** |

CARRY-IN COMPANY SETTING

| COMPANY | ***** |
|---|---|
| SECT. | ****** |
| ADDRESS | ****** |
| IN CHARGE | ***** |
| TEL | --** |

| COMPANY CODE | BRANCH NO. |
|---|---|
| ***** | ***** |

| NOTE | ******* |
|---|---|

| MAKER OF CARRIED-IN MACHINE | COMPANY CODE | PRODUCTS | CLASS. | QT. | NOTE |
|---|---|---|---|---|---|
| **** | **** | *** | MACHINE | 1 | ***** |

SETTLE     BACK

STICK-ON SLIP FOR COLLECTED MACHINE
(COLLECTION DEPOT)

ENTERED ON: 2001.09.23

STORAGE PLACE: ***CO., LTD.
**COLLECTION DEPOT
TEL --**

STORING DATE: 2001.09.22
MANAGEMENT NO.: ODL12-3224

| CARRY-IN COMPANY (COMPANY CODE) | COMPANY A | JBMA003 |
|---|---|---|
| CARRY-IN COMPANY (COMPANY CODE) | COMPANY C | JBMA005 |

| PRODUCTS | PRODUCT CLASSIFICATION | | |
|---|---|---|---|
| | MACHINE | ACCESSORY | EXPENDABLES |
| V550 | O | | |

| APPEARANCE CONDITION | TOP, FRONT SIDE, RIGHT SIDE, REAR, OTHER HOLE, CRACK, DENT, NO COVER, OTHER |
|---|---|

| NOTES | |
|---|---|

STICK-ON SLIP FOR COLLECTED MACHINE
(EXCHANGE CENTER)

ENTERED ON: 2001.10.2

STORAGE PLACE: ***CO., LTD.
**COLLECTION DEPOT
TEL --**

STORING DATE: 2001.10.1
MANAGEMENT NO.: AKP-123

| CARRY-IN COMPANY (COMPANY CODE) | COMPANY A | JBMA003 |
|---|---|---|
| CARRY-IN COMPANY (COMPANY CODE) | COMPANY C | JBMA005 |

| PRODUCTS | PRODUCT CLASS./VOLUME CLASS. | | | | | |
|---|---|---|---|---|---|---|
| | MACHINE | | | ACCESSORY | | EXPENDABLE |
| | LARGE | MEDIUM | SMALL | MEDIUM | SMALL | VERY SMALL |
| V550 | | O | | O | | |

| APPEARANCE CONDITION | TOP, FRONT SIDE, RIGHT SIDE, REAR, OTHER HOLE, CRACK, DENT, NO COVER, OTHER |
|---|---|

| NOTES | |
|---|---|

*FIG. 24B*

ENTRY DATE:2002.01.07

COLLECTED-MACHINE TRANSPORTING REPORT

| OO TRANSPORT CO., LTD<br>KOBE BRANCH<br>OX KOBE COLLECTION<br>DEPOT<br>TEL:*-*-*** | → | OO TRANSPORT CO., LTD<br>OSAKA BRANCH<br>OSAKA EXCHANGE CENTER<br>MR. OO<br>TEL:*-*-*** | DESIRED CARRY-IN DATE:<br>2002.01.08 |
|---|---|---|---|
| | | | CARRY-IN MEANS/CAR NO.: 2t<br>LONG FLAT BODY |

| MAKER NAME FOR COLLECTED MACHINE (COMPANY CODE) | PRODUCT NAME | ACCESSORIES | | | QUANTITY | DEPOT-ONLY COLUMN (MANAGEMENT NO.) |
|---|---|---|---|---|---|---|
| | | MACHINE | ACCESSORIES | EXPENDABLES | | |
| COMPANY A | *** | O | | | 1 | KB1-01 |
| COMPANY B | *** | | O | | 1 | DAMAGE ON PANEL  KB1-02 |
| COMPANY C | *** | | | O | 3 | KB1-03 |
| | | | | | | |
| TOTAL | — | 1 | 1 | 1 | 5 | |

| MEMO | ETA IS ABOUT 16:30. I'LL GO IN FLAT BODY.<br>PLEASE HELP UNLOADING |
|---|---|

*FIG. 25*

SCREEN FOR MAKING COLLECTED-MACHINE TRANSPORTING REPORT

LOG OUT
COMPANY CODE XXXXXXXX
COMPANY NAME XXXXXXXXX

MAKING COLLECTED-MACHINE TRANSPORTING REPORT

| OO TRANSPORT CO., LTD KOBE BRANCH OX KOBE COLLECTION DEPOT TEL:*-*-*** | → | OO TRANSPORT CO., LTD OSAKA BRANCH OSAKA EXCHANGE CENTER TO PERSON IN CHARGE OF COLLECTION SYSTEM TEL:*-*-*** |

DESIRED TRANSPORT DATE
YEAR  MONTH  DAY
20 [  ]  [  ]  [  ]

TRANSPORT MEANS/CAR NO.
2t LONG FLAT BODY

| | CARRY-IN COMPANY | TAKE-BACK COMPANY | PRODUCT NAME | PRODUCT CLASSIFICATION | QUANTITY | MANAGEMENT NO. | APPEARANCE CONDITIONS |
|---|---|---|---|---|---|---|---|
| ☐ | XXXX | XXXX | XXXX | X | 1 | XXXX | XXXX |
| ☐ | XXXX | XXXX | XXXX | X | 1 | XXXX | XXXX |
| ☐ | XXXX | XXXX | XXXX | X | 3 | XXXX | XXXX |
| ☐ | XXXX | XXXX | XXXX | X | 1 | XXXX | XXXX |
| ☐ | XXXX | XXXX | XXXX | X | 1 | XXXX | XXXX |

| MEMO | ETA IS ABOUT 16:30. I'LL GO IN FLAT BODY. PLEASE HELP UNLOADING |

[ TRANSMIT ]    [ RETURN TO MENU ]

FIG. 26

CHECK – SCREEN FOR MAKING COLLECTED-MACHINE TRANSPORTING REPORT

LOG OUT
COMPANY CODE XXXXXXXXX
COMPANY NAME XXXXXXXXXX

CHECK – MAKING COLLECTED-MACHINE TRANSPORTING REPORT

TRANSPORTING REPORT IS MADE WITH FOLLOWING CONTENTS.
CHECK THEM AND CLICK SEND BUTTON.

OO TRANSPORT CO., LTD
KOBE BRANCH
OX KOBE COLLECTION DEPOT
TEL:*-*-***

→

OO TRANSPORT CO., LTD
OSAKA BRANCH
OSAKA EXCHANGE CENTER
TO PERSON IN CHARGE
OF COLLECTION SYSTEM
TEL:*-*-***

DESIRED TRANSPORT DATE
YEAR    MONTH    DAY
20        **

TRANSPORT MEANS/CAR NO.
2t LONG FLAT BODY

| | CARRY-IN COMPANY | TAKE-BACK COMPANY | PRODUCT NAME | PRODUCT CLASSIFICATION | QUANTITY | MANAGEMENT NO. | APPEARANCE CONDITIONS |
|---|---|---|---|---|---|---|---|
| ☐ | XXXX | XXXX | XXXX | X | 999 | XXXX | XXXX |
| ☐ | XXXX | XXXX | XXXX | X | 999 | XXXX | XXXX |

MEMO    ETA IS ABOUT 16:30. I'LL GO IN FLAT BODY.
PLEASE HELP UNLOADING

[ SETTLE ]    [ RETURN TO MENU ]

*FIG. 27*

LIST OF COLLECTED-MACHINE TRANSPORTING REPORTS

LOG OUT

| DOCUMENT NO. | REGISTRATION DATE | COLLECTION DEPOT |
|---|---|---|
| F034416 | DECEMBER 25, 2001 | COLLECTION DEPOT I |
| F034415 | DECEMBER 25, 2001 | COLLECTION DEPOT K |
| F034414 | DECEMBER 24, 2001 | COLLECTION DEPOT J |
| F034413 | DECEMBER 23, 2001 | COLLECTION DEPOT I |
| F034412 | DECEMBER 23, 2001 | COLLECTION DEPOT L |
| ⋮ | ⋮ | ⋮ |

RETURN

*FIG. 30*

REGISTRATION FOR RECEPTION OF COLLECTED MACHINES
(CENTER STORAGE SETTLED)

LOG OUT

RECEPTION REGION NAME:xxxxx

STORING DATE
YEAR 20☐ ☐ MONTH ☐ DAY ☐

| | SCHEDULED STORING DATE | CARRY-IN COMPANY | TAKE-BACK COMPANY | PRODUCT NAME | PRODUCT CLASSIFICATION | QUANTITY | MANAGEMENT NO. | MACHINE NO. | COUNTER | VOLUME CLASSIFICATION | APPEARANCE CONDITIONS |
|---|---|---|---|---|---|---|---|---|---|---|---|
| ☐ | ..** | XXXX | XXXX | XXXX | XX | 1 | | | | | XXXX |
| | INCIDENTAL EXPENSE | | | | | | | | | | |
| ☐ | ..** | XXXX | XXXX | XXXX | XX | 1 | | | | | XXXX |
| | INCIDENTAL EXPENSE | | | | | | | | | | |
| ☐ | ..** | XXXX | XXXX | XXXX | XX | 1 | | | | | XXXX |
| | INCIDENTAL EXPENSE | | | | | | | | | | |

TRANSMIT   RETURN TO MENU

FIG. 31

CHECK – REGISTRATION FOR RECEPTION OF COLLECTED MACHINES (CENTER STORAGE SETTLED)

RECEPTION REGION NAME:XXXXX

| SCHEDULED STORING DATE | CARRY-IN COMPANY | TAKE-OUT COMPANY | PRODUCT NAME | PRODUCT CLASSIFICATION | QUANTITY | MANAGEMENT NO. | MACHINE NO. | COUNTER | VOLUME CLASSIFICATION | APPEARANCE CONDITIONS |
|---|---|---|---|---|---|---|---|---|---|---|
| ..** | XXXX | XXXX | XXXX | XX | 1 | | 123 | 321 | LARGE | XXXX |

INCIDENTAL EXPENSE [CHECK MACHINE NO., CHECK COUNTER, REMOVE/DETACH, HOKKAIDO A]

| SCHEDULED STORING DATE | CARRY-IN COMPANY | TAKE-OUT COMPANY | PRODUCT NAME | PRODUCT CLASSIFICATION | QUANTITY | MANAGEMENT NO. | MACHINE NO. | COUNTER | VOLUME CLASSIFICATION | APPEARANCE CONDITIONS |
|---|---|---|---|---|---|---|---|---|---|---|
| ..** | XXXX | XXXX | XXXX | XX | 1 | | 456 | 654 | MEDIUM | XXXX |

INCIDENTAL EXPENSE [CHECK MACHINE NO., CHECK COUNTER, HOKKAIDO B]

| SCHEDULED STORING DATE | CARRY-IN COMPANY | TAKE-OUT COMPANY | PRODUCT NAME | PRODUCT CLASSIFICATION | QUANTITY | MANAGEMENT NO. | MACHINE NO. | COUNTER | VOLUME CLASSIFICATION | APPEARANCE CONDITIONS |
|---|---|---|---|---|---|---|---|---|---|---|
| ..** | XXXX | XXXX | XXXX | XX | 1 | | 789 | 987 | SMALL | XXXX |

INCIDENTAL EXPENSE [CHECK MACHINE NO., CHECK COUNTER, REMOVE/DETACH, FREIGHT CHARGE FOR DELIVERY TO OKINAWA]

SETTLE    RETURN TO MENU

FIG. 32

OUTPUT DATE: 2002.01.07

COLLECTED-MACHINE INVENTORY REPORT

REPORT TO: OO BUSINESS MACHINE CO., LTD
OSAKA BRANCH DISTRIBUTION DEPARTMENT
OSAKA CITY
06 ******** MR. OO

REPORTED BY: OO TRANSPORT CO., LTD
OSAKA BRANCH
OSAKA EXCHANGE CENTER
PERSON IN CHARGE
06 ********

COMPANY CODE
(JBMA003)

THE FOLLOWING IS THE INVENTORY OF COLLECTED MACHINES AS OF JANUARY 7, 2002.
PLEASE REPORT TAKE-OUT PLAN.

| STORING DATE | PRODUCT NAME | MANAGE-MENT NO. | QT. | MACHINE NO. | METER | PRODUCT / VOL. CLASS. | APPEARANCE | CARRIER (CO.CODE) | COMPANY-ONLY COLUMN |
|---|---|---|---|---|---|---|---|---|---|
| 01.12.21 | **** | Osk1-026 | 1 | 12345 | | MACHINE (MID) | | COMPANY A (JBMA005) | |
| 02.01.05 | **** | Osk1-029 | 1 | 23456 | | MACHINE (MID) | R-SIDE DAMAGED | COMPANY B (JBMA001) | |
| 02.01.06 | **** | Osk1-030 | 3 | 34567 | | MACHINE (LARGE) | | COMPANY C (JBMA002) | |
| | | | | | | | | | |
| — | — | TOTAL | 5 | 5 | | | | — | |

MEMO (NOTE) IT IS DESIRABLE THAT THE OUTPUT HAS A PRODUCT DETAILS COLUMN OF AT LEAST 24 LINES.

*FIG. 33*

OUTPUT DATE:2002.01.07

COLLECTED-MACHINE TAKE-OUT REQUEST

CONFIRMATION REQUEST TO:
OO TRANSPORT CO., LTD
OSAKA EXCHANGE CENTER
PERSON IN CHARGE
06 ✱✱✱✱✱✱✱✱

TAKE-OUT COMPANY NAME:
OO BUSINESS MACHINE CO., LTD
06 ✱✱✱✱✱✱✱✱
COMPANY CODE (JBMA003)

| DISTRIBUTION MEANS | TAKE OUT BY LOCAL COMPANY TRANSPORTATION | |
|---|---|---|
| | DELIVERY REQUEST | O |

| DESIRED TAKE-OUT/DELIVERY DATE: 2002.01.08 |
|---|
| TAKE-OUT DEALER NAME: |

MEMO(NOTE)

| STORING DATE | MANAGE-MENT NO. | PRODUCT NAME | MACHINE NO. | QUAN-TITY | PRODUCT CLASSIFICATION VOLUME CLASSIFICATION | APPEARANCE CONDITIONS |
|---|---|---|---|---|---|---|
| 01.12.21 | Osk1-028 | ✱✱✱✱ | 12345 | 1 | MACHINE (MEDIUM) | |
| 02.01.05 | Osk1-029 | ✱✱✱✱ | 23456 | 1 | MACHINE (MEDIUM) | DAMAGE ON RIGHT SIDE |
| 02.01.06 | Osk1-030 | ✱✱✱✱ | 34567 | 3 | MACHINE (LARGE) | |
| | | | | | | |
| --- | --- | --- | TOTAL | 5 | --- | --- |

| MAKER-ONLY COLUMN | |
|---|---|
| BRANCH NO. | NOTES |
| | |
| | |
| | |
| | |

OUTPUT DATE:2002.01.07

COLLECTED-MACHINE TAKE-OUT REQUEST

CONFIRMATION REQUEST TO:
OO TRANSPORT CO., LTD
OSAKA EXCHANGE CENTER
PERSON IN CHARGE
06 ********

TAKE-OUT COMPANY NAME:
OO BUSINESS MACHINE CO., LTD
06 ********
COMPANY CODE (JBMA003)

| DISTRIBUTION MEANS | TAKE OUT BY LOCAL COMPANY TRANSPORTATION | |
|---|---|---|
| | DELIVERY REQUEST | O |

| DESIRED TAKE-OUT/DELIVERY DATE: 2002.01.08 |
|---|
| TAKE-OUT DEALER NAME: |

MEMO(NOTE)

| | STORING DATE | MANAGE-MENT NO. | PRODUCT NAME | MACHINE NO. | QT | PRODUCT CLASSIFICATION VOLUME CLASSIFICATION | APPEARANCE CONDITIONS |
|---|---|---|---|---|---|---|---|
| ☐ | 01.12.21 | Osk1-026 | **** | 12345 | 1 | MACHINE (MEDIUM) | |
| ☐ | 02.01.05 | Osk1-029 | **** | 23456 | 1 | MACHINE (MEDIUM) | DAMAGE ON RIGHT SIDE |
| ☐ | 02.01.06 | Osk1-030 | **** | 34567 | 3 | MACHINE (LARGE) | |
| | — | — | — | — | — | — | — |

TRANSMIT    BACK

| MAKER-ONLY COLUMN | |
|---|---|
| BRANCH NO. | NOTES |
| | |
| | |
| | |

SYSTEM AND METHOD OF ASSISTING GOODS COLLECTION AND RECORDING MEDIUM

CROSS-REFERENCE TO RELATED APPLICATIONS

The present application is a continuation of U.S. application Ser. No. 10/028,793, filed Dec. 28, 2001, now abandoned and is based on Japanese patent application nos. 2000/402196 and 2001/401258, the entire contents of each of which are incorporated herein by reference.

BACKGROUND OF THE INVENTION

1. Field of the Invention

The present invention relates to a goods collection assisting system, a goods collection assisting method and a recording medium in which a program for executing the method is recorded. More particularly, the invention relates to a technique which allows any entity, regardless of whether or not it is a manufacturer, to easily reuse used products or goods as resources.

2. Description of the Related Art

While the industrial world, particularly manufacturers, have contributed to convenience and stability of people's social lives, they have deteriorated the natural environment and consumed a vast amount of resources.

In Japan, for example, the existing landfills are not sufficient for the enormous amount of industrial wastes that are discharged, so that illegal dumping of industrial wastes increases and is becoming a serious matter. To protect the natural environment and effectively use resources, therefore, many makers are currently making efforts to construct a circulating economical system which reuses wastes as resources.

The circulating economical system is generally compared to the circulation of blood in a human body. Blood is supplied with oxygen in the lungs and is pumped out to all over the body from the heart through the main artery. The oxygen in the blood is consumed at individual portions of the body. The blood that flows in a vein carries a lot of carbon dioxide instead of oxygen, returns to the heart and is fed again to the lungs.

In the circulation of the circulating economical system, like the circulation of the blood, goods (blood containing lots of oxygen) are supplied (physical distribution through the artery) and wastes (blood containing lots of carbon dioxide) are collected (physical distribution through the veins) to circulate resources.

One of physical distributions through the veins is a system that distributes disused industrial goods as used goods. According to the system, a user proposes the selling of, for example, disused OA apparatuses to a mediator. The mediator buys the disused OA apparatuses and sells them as used apparatuses and used parts. The mediator resells those goods which cannot be sold to consumers to a dismantler for their reuse as resources.

In such a sales system, used goods are not guaranteed by makers, so that users cannot handle the matters that occur through the use of used apparatuses and parts.

To solve such a problem, makers should construct a system which allows the makers themselves to collect disused apparatuses from users. This system is realized by, in Japan, for example, makers who produce lens-equipped films. A plurality of makers of lens-equipped films exchange lens-equipped films collected at processing laboratories with one another and cooperate to build a reuse recycle system. Lens-equipped films that are brought into processing laboratories are sent back to the makers who have produced them. Each maker dismantles the collected units, reuses the lenses, flash substrates, etc. and recycles plastic, paper and so forth.

As lens-equipped films are compact and light, they can easily be sorted by maker and a relatively small space is needed for their storage. Further, because users bring lens equipped films to processing laboratories for development after usage, the makers need to make relatively small efforts to collect them.

Office apparatuses, such as copying machines, are industrial goods which are in good contrast to lens-equipped films. For example, most of copying machines are relatively large and precision machines that need maintenance. To provide users with the up-to-date capabilities and the latest design on demand, copying machines are generally traded in. Each maker has operated its own system of collecting used copying machines, dismantling them and reusing and recycling the dismantled components.

However, the free sales competition based on the market mechanism is likely to lead to a case where each maker collects copying machines produced by other makers. Because the reuse and recycle system of each maker is not designed for trade-in products manufactured by other makers, the trade-in products are disposed after being shredded by a large shredder or the like. Apparently, it is not possible to effective use collected goods as resources.

Such a problem is not inherent to copying machines but arises in various office machines, such as a printer and a facsimile. Further, a similar problem arises not only in various office machines but also in electric home appliances, such as TV, a washing machine and a refrigerator, and industrial machines, such as a vehicle and a furniture.

SUMMARY OF THE INVENTION

Accordingly, it is an object of the invention to provide a goods collection assisting system and method which allow any entity, regardless of whether or not it is a manufacturer, to effectively use disused products as resources.

It is another object of the invention to provide a system and method which efficiently carry out the work of properly exchanging collected used goods.

To achieve the above objects, according to a first aspect of the invention, there is provided a goods collection assisting system for assisting a work of allowing each of a plurality of business entities to exchange used goods of other business entities which are collected with sales of goods of the each business entity with the other business entities and take back goods of the each business entity. The goods collection assisting system comprises:

a collected goods information input unit for inputting collected goods information representing collected goods to be stored in a predetermined storage place;

an information processing system for storing the collected goods information input from the collected goods information input unit, processing the stored collected goods information, preparing stored goods information indicating collected goods to be taken back by each of the plurality of business entities and notifying each business entity of the stored goods information;

a receiver information processing terminal for receiving and outputting the stored goods information from the information processing system, and inputting desired goods-to-take-back information associated with collected goods each business entity wants to take back and prepared based on the stored goods information; and a keeper information processing terminal for receiving and outputting the desired goods-to-take-back information input from the receiver information processing terminal.

It is preferable that information about the collected goods should include information for specifying a manufacturer of the goods, and the information processing system should classify the collected goods by manufacturer and prepares the stored goods information based on that classification.

The collected goods information input unit may include a desired goods-to-bring-in information input unit for inputting desired goods-to-bring-in information about the goods each business entity wants to bring in before the each business entity brings collected goods in the predetermined storage place, and a unit for inputting information indicating that the collected goods have been brought in when the collected goods have been brought in the predetermined storage place.

The goods collection assisting system may further comprise a unit for outputting the desired goods-to-bring-in information to be ready for reception at the predetermined storage place.

The keeper information processing terminal may receive the desired goods-to-take-back information via the information processing system.

The information processing system may exclude from the collected goods information those collected goods which are specified by the desired goods-to-take-back information as desired goods to take back.

The keeper information processing terminal may output the desired goods-to-take-back information to be ready for shipment from predetermined storage place.

The keeper information processing terminal may input shipment information indicating collected goods which has been shipped out of the predetermined storage place, and the information processing system may store the shipment information from the keeper information processing terminal in association with the stored collected goods information and excludes the shipped collected goods from the stored goods information.

The predetermined storage place may include plural first storage places for receiving collected goods from the business entities and one or plural second storage places, provided one for a plurality of the first storage places, for stocking the collected goods stored in the plurality of first storage places, and the information processing system may store, for individual collected goods, information including those business entities which have collected the individual collected goods, those business entities which are to take back the individual collected goods, information specifying the individual collected goods, a scheduled reception date of receiving the individual collected goods in the first storage places, a reception date at which the individual collected goods have been received in the first storage places, a scheduled transporting date of transporting the individual collected goods to the second storage places from the first storage places, a scheduled delivering-out date of delivering the individual collected goods to individual business entities from the second storage places and a delivering-out date at which the individual collected goods have been delivered to individual business entities from the second storage places.

The information processing system may execute a charging process of charging each business entity for storage and exchange works based on at least a quantity and a storage period of collected goods stored in the predetermined storage place.

It is preferable that for each of the collected goods, the information processing system should store at least one of a scheduled date of delivery into the predetermined storage place, an actual delivering-in date, a collecting business entity, a taking-back business entity, information specifying goods, a scheduled delivering-out date and an actual delivering-out date.

The information processing system may prepare the stored goods information every given period and sends the stored goods information to each business entity.

According to a second aspect of the invention, there is provided a goods collection assisting system which assists a work of allowing each of a plurality of business entities to exchange used goods of other business entities which are collected with the other business entities and take back used goods the each business entity wants to take back, and which:

stores collected goods information representing collected goods stored in a predetermined storage place in a memory unit;

processes the collected goods information stored in the memory unit to prepare stored goods information to be referred to by the plurality of business entities to take back collected goods, and receives desired goods-to-take-back information prepared based on the stored goods information and associated with collected goods each business entity wants to take back.

The goods collection assisting system may:

accept and stores storing schedule information indicating a scheduled storing date in the memory unit before the each business entity brings used goods in the predetermined storage place, accept storage information indicating an actual date of receiving the collected goods in the predetermined storage place and stores the storage information in the memory unit in association with the storing schedule information, store a desired taking-back date, included in the desired goods-to-take-back information, in the memory unit in association with the storage information, and accept delivering-out information indicating an actual date of delivery out of the predetermined storage place and stores the delivering-out information in the memory unit in association with the desired taking-back date.

The predetermined storage place may include plural first storage places for receiving collected goods from the business entities and a second storage place, provided one for the plural first storage places, for receiving the collected goods stored in the plurality of first storage places, and the memory unit may store information indicating a delivering-in date of delivery of the collected goods into the first storage places, a delivering-in date of delivery of the collected goods into the second storage place and a delivering-out date of carrying the collected goods out of the second storage place to an associated business entity.

The goods collection assisting system may further comprise charge means for charging each business entity for storage and exchange works based on at least a quantity and a storage period of collected goods for each taking-back business entity.

It is preferable that in response to an access from any business entity, information stored in the memory unit should be added up in accordance with a condition indicated by the business entity and provided to an information processing apparatus of the business entity.

According to a third aspect of the invention, there is provided an information processing system for a business entity which assists a work of allowing each of a plurality of business entities to exchange used goods of other business entities which are collected with the other business entities and take back the collected goods the each business entity wants to take back, and which:

sends carry-in schedule information indicating a schedule of bringing used goods into a predetermined storage place to a control information processing unit, receives stored goods information indicating goods stored in the predetermined storage place and to be taken back by the business entity from the control information processing unit and outputs the stored goods information, and transmits desired goods-to-take-back information indicating a schedule of taking back the goods to the control information processing unit.

The predetermined storage place may include plural first storage places in which the business entities bring collected goods and one or plural second storage places, provided one for a plurality of the first storage places, for stocking the collected goods stored in the plurality of first storage places, and the carry-in schedule information includes a scheduled date of bringing collected goods into the first storage places, a carry-in business entity, a taking-back business entity and information indicating collected goods, and the desired goods-to-take-back information includes information specifying collected goods, transported from any one of the first storage places to the second storage place and stocked in the second storage place and a scheduled taking-back date.

It is preferable that at least one of a bill and a detailed statement prepared based on at least a storage period of collected goods for each business entity in the predetermined storage place should be received from the control information processing unit and output.

The control information processing unit may be instructed on an adding condition and information added based on the adding condition may be received from the control information processing unit and output.

According to a fourth aspect of the invention, there is provided an information processing system for goods collection assistance, which assists a work of allowing each of a plurality of business entities to exchange used goods of other business entities which are collected with the other business entities and take back used goods the each business entity wants to take back, and which:

receives a schedule of bringing collected goods into a predetermined storage place from a control information processing system for controlling collected goods and outputs the schedule, sends storage information of the collected goods brought in the predetermined storage place to the control information processing system, receives and outputs desired goods-to-take-back information about used goods each taking-back business entity wants to take back via the control information processing system, and sends information indicating goods delivery out of the predetermined storage place to the control information processing system.

The predetermined storage place may include plural first storage places for receiving collected goods from the business entities and one or plural second storage places, provided one for a plurality of the first storage places, which stock the collected goods from the plurality of first storage places and at which the stocked collected goods are delivered to a take-back business entity, and the information processing system may send the control information processing system information indicating one of a collecting business entity and a taking-back business entity of collected goods delivered in the first storage places, a delivering-in date of delivery in the first storage places, a transporting date of transportation to the second storage places from the first storage places, and a date at which the collected goods have been taken back to the taking-back business entity.

The information processing system may access the control information processing system and designate an adding condition, and receives information added in accordance with the adding condition from the control information processing system and outputting the information.

According to a fifth aspect of the invention, there is provided a goods collection assisting method of assisting a work of allowing each of a plurality of business entities to exchange used goods of other business entities which are collected with the other business entities and take back used goods the each business entity wants to take back. The method comprises:

a collected goods information input step of inputting collected goods information representing collected goods to be stored in a predetermined storage place;

an information processing step of storing the collected goods information input from the collected goods information input unit, processing the stored collected goods information, preparing stored goods information indicating collected goods to be taken back by each of the plurality of business entities and notifying each business entity of the stored goods information;

a receiver information processing step of receiving and outputting the stored goods information from the information processing step, and inputting desired goods-to-take-back information associated with collected goods each business entity wants to take back and prepared based on the stored goods information; and a keeper information processing step of receiving and outputting the desired goods-to-take-back information input from the receiver information processing step.

According to a sixth aspect of the invention, there is provided a goods collection assisting method which assists a work of allowing each of a plurality of business entities to exchange used goods of other business entities which are collected with the other business entities and take back used goods the each business entity wants to take back, and which comprises:

a step of storing collected goods information representing collected goods to be stored in a predetermined storage place in a memory unit;

a step of processing the collected goods information stored in the memory unit to prepare stored goods information to be referred to by the plurality of business entities to take back collected goods; and a step of receiving desired goods-to-take-back information prepared based on the stored goods information and associated with collected goods each business entity wants to take back.

According to a seventh aspect of the invention, there is provided an information processing method for a business entity which assists a work of allowing each of a plurality of business entities to exchange used goods of other business entities which are collected with the other business entities and take back the used goods the each business entity wants to take back, and which comprises:

a step of sending carry-in schedule information indicating a schedule of bringing used goods into a predetermined storage place to a control information processing unit;

a step of receiving stored goods information indicating goods stored in the predetermined storage place and to be taken back by the business entity from the control information processing unit and outputting the stored goods information; and a step of transmitting desired goods-to-take-back information indicating a schedule of taking back the goods to the control information processing unit.

According to an eighth aspect of the invention, there is provided an information processing method for goods collection assistance, which assists a work of allowing each of a plurality of business entities to exchange used goods of other business entities which are collected with the other business entities and take back used goods the each business entity wants to take back, and which comprises:

a step of receiving a schedule of bringing collected goods into a predetermined storage place from a control information processing system for controlling collected goods and outputting the schedule;

a step of sending storage information of the collected goods brought in the predetermined storage place to the control information processing system, a step of receiving and outputting desired goods-to-take-back information about used goods each taking-back business entity wants to take back via the control information processing system; and a step of sending information indicating goods delivery out of the predetermined storage place to the control information processing system.

According to a ninth aspect of the invention, there is provided a goods collection assisting method comprising the steps of:

inputting information about used goods brought in by a carrying-in person into a predetermined storage place through first input means;

storing the input information about goods in memory means;

extracting information about goods stored in the memory means and preparing stored goods information to be referred to by a plurality of taking-back persons;

receiving, through second input means, desired goods-to-take-back information which is prepared based on the prepared stored goods information and is about goods each taking-back person wants to take back;

performing a predetermined process based on the input desired goods-to-take-back information and the information about goods stored in the memory means, thereby preparing delivering-out information for delivering goods out of the predetermined storage place; and outputting the prepared delivering-out information.

According to a tenth aspect of the invention, there is provided a computer program for allowing a computer to execute the steps of:

inputting, through first input means, information about used goods which are brought in by a carrying-in person into a predetermined storage place and which are at least partly reusable or recyclable;

storing the input information about goods in memory means;

extracting information about goods stored in the memory means and preparing stored goods information to be referred to by a plurality of taking-back persons;

receiving, through second input means, desired goods-to-take-back information which is prepared based on the prepared stored goods information and is about goods each taking-back person wants to take back;

performing a predetermined process based on the input desired goods-to-take-back information and the information about goods stored in the memory means, thereby preparing delivering-out information for delivering goods out of the predetermined storage place; and outputting the prepared delivering-out information.

BRIEF DESCRIPTION OF THE DRAWINGS

FIG. 4 is a diagram showing an example of desired goods-to-be-stocked data;

FIG. 6 is a diagram exemplifying inventory information which is distributed to individual makers;

FIG. 7 is a diagram exemplifying desired goods-to-ship data which is sent from each maker;

FIG. 8 is a diagram exemplifying delivering-out information;

FIG. 13A is a diagram showing the data structure of information to be recorded in a for-each-user area in a data base shown in FIG. 12;

FIG. 13B is a diagram showing the data structure of information to be recorded in a for-each-collection-depot area in the data base shown in FIG. 12;

FIG. 13C is a diagram showing the data structure of information to be recorded in a for-each-exchange-center area in the data base shown in FIG. 12;

FIG. 17 is a diagram showing a display example of a process selection screen which is transmitted in the process illustrated in FIG. 15;

FIG. 18 is a diagram showing a display example of an input screen for a collected machine carry-in request which is transmitted in the process illustrated in FIG. 15;

FIG. 19 is a diagram showing an example of a document which is prepared in the process illustrated in FIG. 15;

FIG. 21 is a diagram showing a display example of a carry-in request list which is made in the process illustrated in FIG. 20;

FIG. 22 is a diagram showing a display example of a display screen for a carry-in request selected from the list shown in FIG. 21;

FIG. 23 is a diagram showing a display example of a screen for checking what has been input in the carry-in request shown in FIG. 22;

FIGS. 24A and 24B are a diagram exemplifying a stick-on slip which is prepared according to the second embodiment of the invention;

FIG. 25 is a diagram exemplifying a collected-machine transporting report which is made according to the second embodiment of the invention;

FIG. 26 is a diagram showing a display example of a screen for making the collected-machine transporting report that is made according to the second embodiment of the invention;

FIG. 27 is a diagram showing a display example of a screen for checking input contents on the report creating screen shown in FIG. 26;

FIG. 30 is a diagram showing an example of a report list which

FIG. 31 is a diagram showing a display example of a collected machine reception registering (storage-in-center setting) screen for editing a collected-machine transporting report which is selected from the report list shown in FIG. 30;

FIG. 32 is a diagram showing a display example of a screen for checking what has been input on the screen shown in FIG. 31;

FIG. 33 is a diagram showing an example of a document which is prepared in the second embodiment of the invention;

FIG. 34 is a diagram showing an example of a collected-machine take-back request which is prepared in the second embodiment of the invention; and FIG. 35 is a diagram showing a display example of a screen for inputting the collected-machine take-back request.

DETAILED DESCRIPTION OF THE PREFERRED EMBODIMENTS

Preferred embodiments of the invention will now be described in detail with reference to the accompanying drawings.

(First Embodiment)

Figure 1:
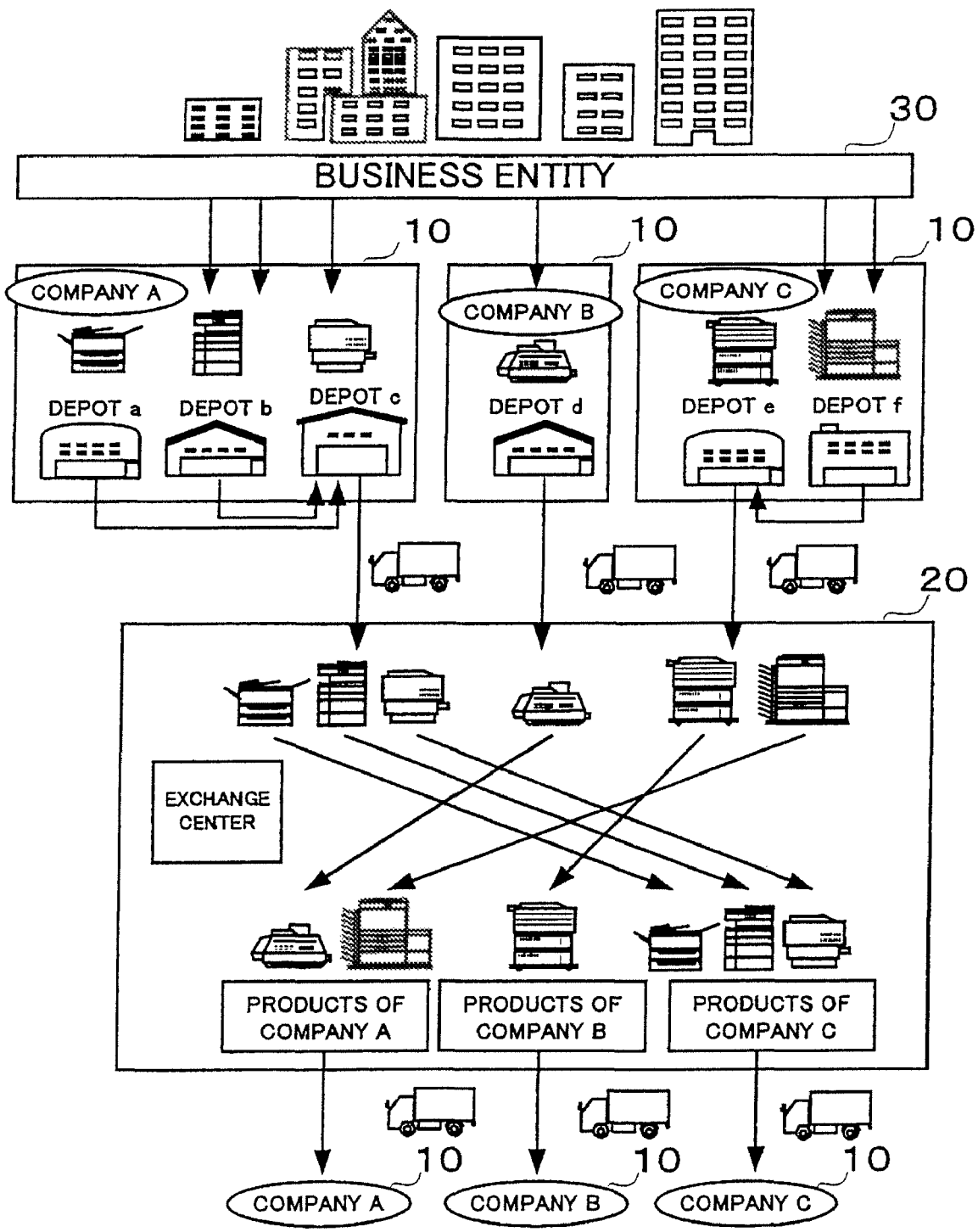
FIG. 1 is a diagram illustrating the flow of a copying machine collecting process to which a goods collection assisting system of the present invention is adapted.

FIG. 1 illustrates the flow of a process to which a goods collection assisting system according to the first embodiment of the present invention is adapted and which can allow makers to collect copying machines among themselves. In the process, as illustrated, in case where each of makers 10 (three companies A, B and C in the diagram) sells its own product or a copying machine to a business entity 30, the maker 10 trades in a used copying machine owned by the business entity 30 including a product of another maker for the new one and temporarily stores the used copying machine in its own warehouse or depot. Each maker 10 brings these of the copying machines stored in the depot which were manufactured by other makers into an exchange center 20.

The exchange center 20 sorts copying machines, brought in by the individual makers 10, by maker, stores the sorted copying machines, and manages the stored copying machines as goods in stock (inventory goods). The exchange center 20 sends information about the managed inventory goods to each maker 10. Based on the transmitted information on the inventory goods, each maker 10 collects those copying machines stored in the exchange center 20 which are its own products. That is, the makers 10 exchange used copying machines with one another at the exchange center 20.

Each maker 10 who collected copying machines produced by itself from the exchange center 20 sends the collected copying machines to its own dismantling factory, dismantles the copying machines in the factory to extract reusable parts (such as photosensitive drums) and reuses the extracted parts in new products. The maker 10 sorts recyclable parts (such as plastic parts) by material and uses the parts as material resources. Each maker 10 can allow a subsidiary company or a cooperative company, such as a distributor, to trade in used copying machine, bring goods of other makers into the exchange center 20, collect goods of the maker 10 therefrom, and recycle used copying machine. The work such a subsidiary company or distributor does can also be considered as the substantial work of each maker 10.

Figure 2:
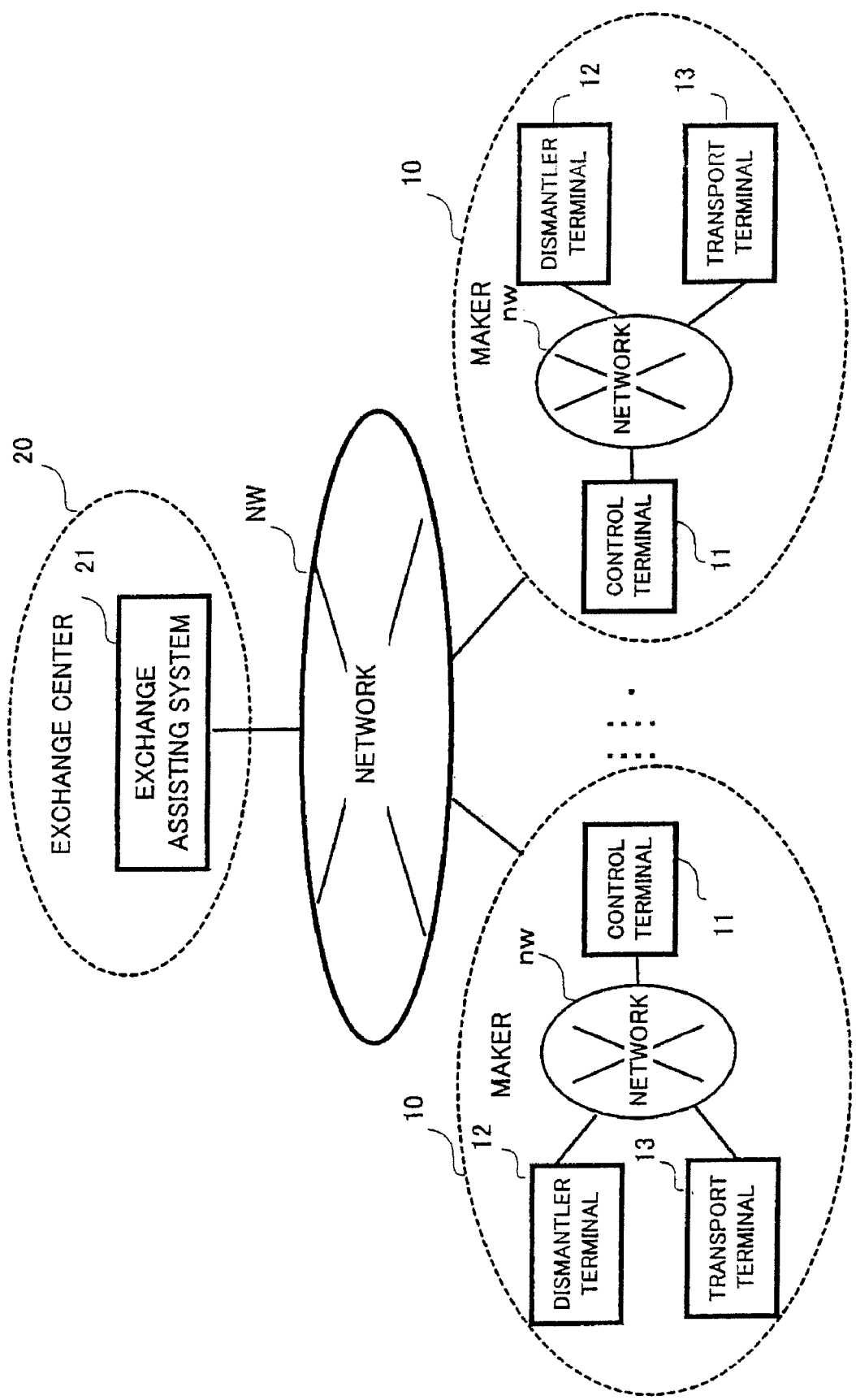
FIG. 2 is a diagram showing the structure of a network system including an exchange assisting system provided in an exchange center in FIG. 1.

FIG. 2 is a diagram showing the structure of a network system which is constructed between an exchange assisting system 21, provided to smoothly exchange copying machines at the exchange center 20, and the individual makers 10 in order to achieve the aforementioned process.

As illustrated, this network system comprises the exchange assisting system 21, located in the exchange center 20, and control terminals 11 which belong to the management departments of the individual makers 10 and are connected to the exchange assisting system 21 via a network NW, such as the Internet. The control terminal 11 of each maker 10 is connected via a network nw, such as an intranet, to a dismantler terminal 12 belonging to a dismantling factory of the maker 10 and a transport terminal 13 belonging to a transporting department having transportation means, such as a track The exchange assisting system 21 executes an assisting process of smoothly exchanging used copying machines among a plurality of makers 10 at the exchange center 20. The exchange assisting system 21 has a function of managing delivery of copying machines to the exchange center 20 from each maker 10, a function of managing copying machines stored in the exchange center 20 or the inventory goods and a function of managing delivery of copying machines to each maker 10 from the exchange center 20. The details of the exchange assisting system 21 will be given later.

The control terminal 11 manages the storage of copying machines collected by the maker 10 into the exchange center 20 and the shipment of copying machines produced by the maker 10 from the exchange center 20 and sends the dismantler terminal 12 information about those of copying machines collected from the business entity 30 and information about products of the associated maker (hereinafter also called "local maker") 10 which are to be and/or have been collected from the exchange center 20. The control terminal 11 also sends the transport terminal 13 information about those products of other makers which are to be stored in the exchange center 20 and information about those products of the local maker which are to be shipped out of the exchange center 20.

The details of the information the control terminal 11 exchanges with the exchange assisting system 21 for exchange of copying machines will be given later. Based on the information sent from the control terminal 11, the dismantler terminal 12 manages information about copying machines to be dismantled Based on the information sent from the control terminal 11, the transport terminal 13 carries out a process of arranging a car for storing products of other makers stored in a warehouse of each maker 10 into the exchange center 20 and a process of arranging a car for collecting products of the local maker stored in the exchange center 20.

Figure 3:
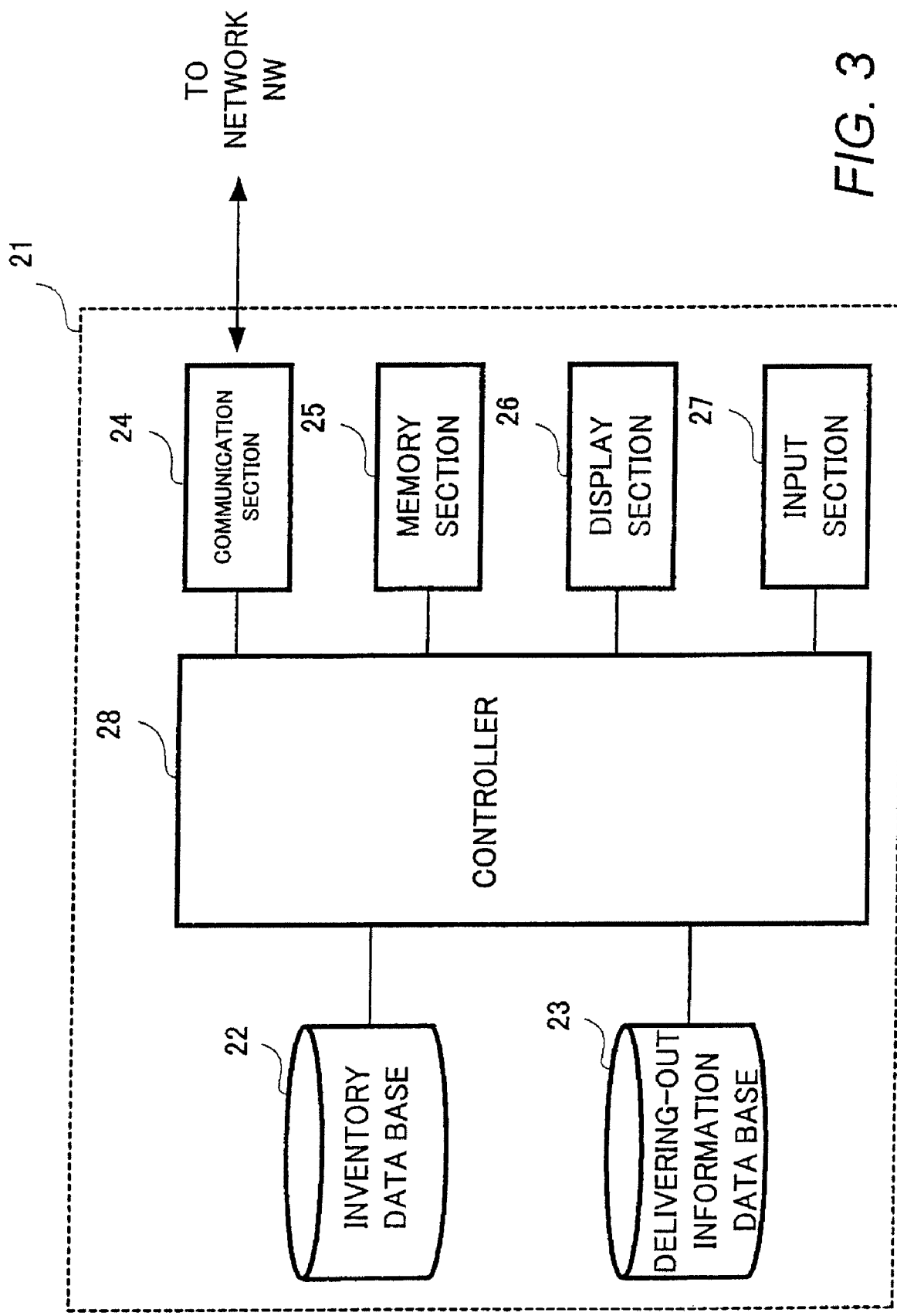
FIG. 3 is a block diagram showing the structure of the exchange assisting system in FIG. 2.

FIG. 3 is a block diagram showing the structure of the exchange assisting system 21 the exchange center 20 in FIG. 2 has. As illustrated, the exchange assisting system 21 has an inventory data base 22, a delivering-out information data base 23, a communication section 24, a memory section 25, a display section 26, an input section 27 and a controller 28.

The inventory data base 22 stores information about the inventory state of used copying machines stored in the exchange center 20. The delivering-out information data base 23 stores information about copying machines which are scheduled to be shipped out of the exchange center 20. The details of the inventory data base 22 and the delivering-out information data base 23 will be given later.

The communication section 24 exchanges information with the control terminals 11 of the individual makers 10 via the network NW under the control of the controller 28. The memory section 25 temporarily stores other information than information that is registered in the inventory data base 22 and delivering-out information data base 23. The display section 26 displays data stored in the inventory data base 22, the delivering-out information data base 23, the memory section 25, etc. under the control of the controller 28. The input section 27 is for inputting various kinds of information and instructions needed for processes through an operator's operation. The controller 28 controls the individual sections in the exchange assisting system 21.

A description will now be given of an example of data which is input to, output from or stored in the exchange assisting system 21 according to the embodiment. Data to be input includes desired goods-to-be-stocked data sent from the control terminal 11 of each maker 10 prior to storage of a copying machine, storage settled data which is input from the input section 27 at the time a copying machine is actually stored, desired goods-to-be-delivered-out data sent from the control terminal 11 of each maker 10 prior to shipment of a copying machine, and shipment settled data which is input from the input section 27 at the time a copying machine is actually shipped out. Data to be output includes inventory information which is sent to the control terminal 11 of each maker 10 every given period and delivering-out information prepared based on desired goods-to-ship data (which is substantially the same as the one stored in the delivering-out information data base 23).

FIG. 4 shows an example of desired goods-to-be-stocked data which is sent from each maker 10. The desired goods-to-be-stocked data, which is prepared by each of the companies A, B and C, indicates the scheduled storing date, the product maker, the machine type, the machine name, the model number and the quantity of machines scheduled to be stored in association with one another, for each of copying machines each company wants to store in the exchange center 20. As FIG. 4 shows the desired goods-to-be-stocked data of the company A on the top, copying machines of the companies B and C other than the company A, as product makers, are wanted to be stored.

Figure 5:
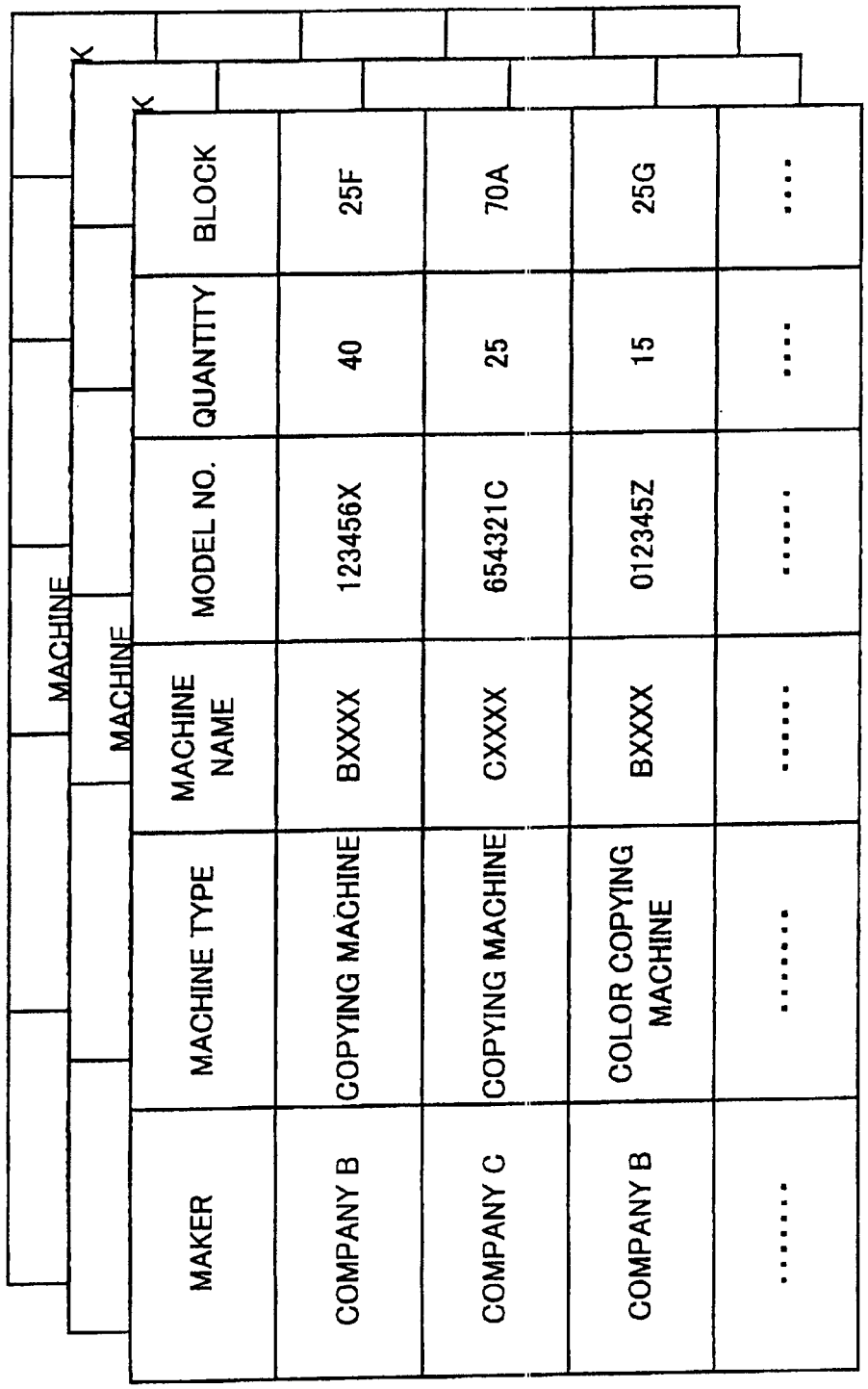
FIG. 5 is a diagram showing an example of the stored contents of an inventory data base.

FIG. 5 shows an example of the inventory data to be stored in the inventory data base 22. Each record of the inventory data is constructed to have the product maker of each copying machine actually stored in the exchange center 20, and the machine type, the machine name, the model number, the quantity and the storage block of each type of machines in stock in association with one another. In this example, copying machines of the same model number are illustrated to be stored in the same block. In case where copying machines of the same model number are to be stored in different blocks, however, the inventory data has only to be created as data consisting of different records for each storage block. Note that each record of storage settled data to be input at the time copying machines are actually stored has substantially the same format as each record of the inventory data.

FIG. 6 exemplifies inventory information which is distributed to the individual makers 10. The inventory information is prepared for each of the companies A, B and C, and includes the machine type, the machine name, the model number and the quantity of copying machines stored in the exchange center 20, as one record for each type of copying machines. FIG. 6 shows inventory information of the company B on the top.

FIG. 7 exemplifies desired goods-to-ship data which is sent from each maker 10. The desired goods-to-ship data is prepared by each of the companies A, B and C, and includes the desired shipping date, the model number and the desired shipping quantity of each type of copying machines that are wanted to be shipped out of the exchange center 20, in association with one another. FIG. 7 shows desired goods-to-ship data of the company B on the top.

FIG. 8 exemplifies delivering-out information which is prepared based on desired goods-to-ship data and inventory data and is stored in the delivering-out information data base 23. The delivering-out information is stored in the delivering-out information data base 23 for each of the companies A, B and C and for each scheduled shipping date desired by each maker 10. Each record of the delivering-out information consists of the scheduled shipping date, the product maker, the machine type, the machine name, the model number, the quantity of machines scheduled to be shipped out in association with one another. Note that each record of shipment settled data to be input at the time copying machines are actually shipped out has substantially the same format as each record of the delivering-out information.

Figure 9:
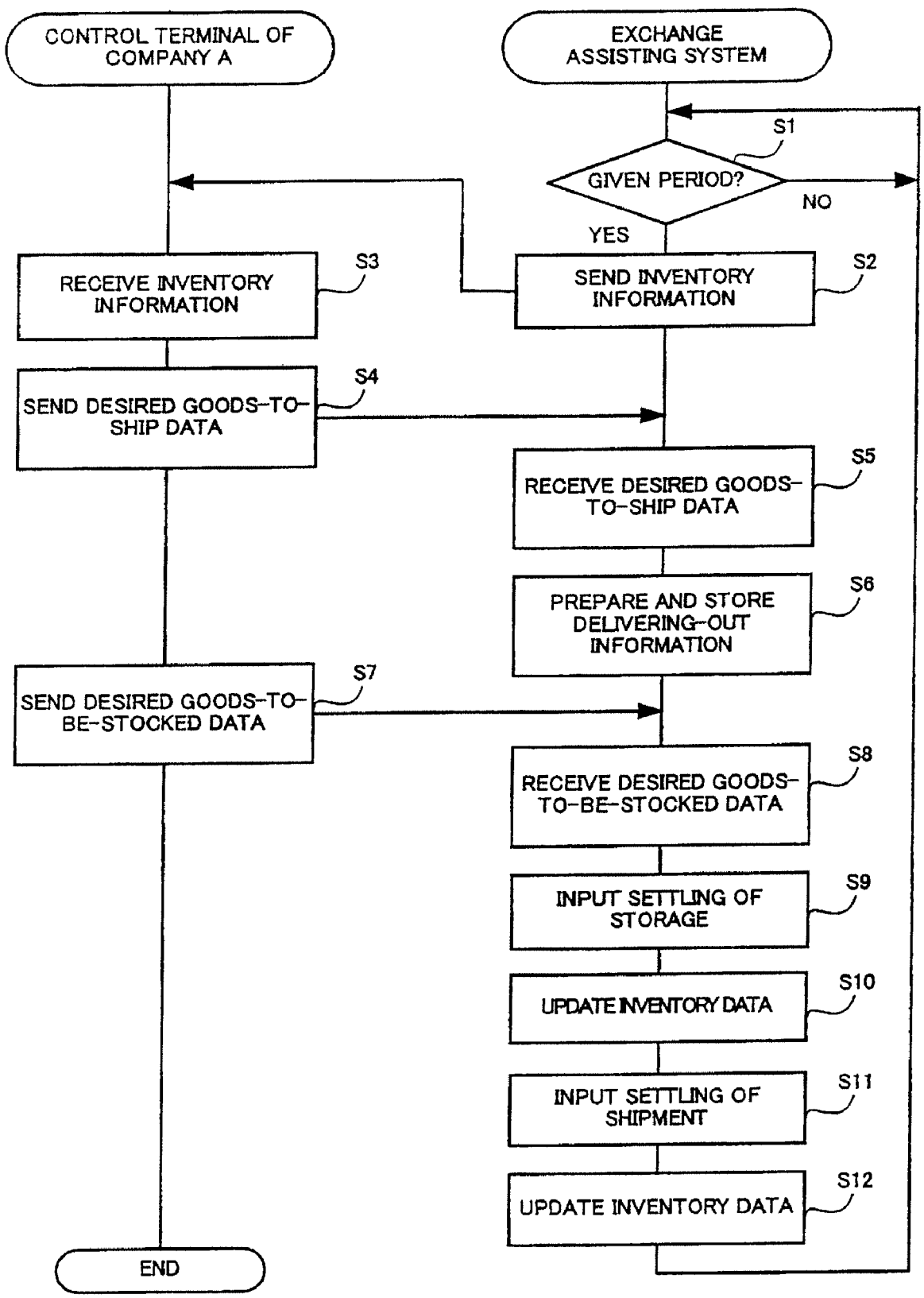
FIG. 9 is a flowchart illustrating a process executed by the network system according to one embodiment of the invention.

A description will now be given of the processing of the network system according to the embodiment, centering on the process of the exchange assisting system 21. FIG. 9 is a flowchart illustrating the process executed by the network system according to the embodiment. The following description will be given of a case where the company A brings products of other companies into the exchange center 20 and collects its own products from the exchange center 20. It is assumed that before the company A collects its own products, the companies B and C have already been brought several products of the company A into the exchange center 20.

The controller 28 of the exchange assisting system 21 monitors if a given period has passed since the previous delivery of inventory information and if the day has come to distribute new inventory information to each maker 10 (step S1). If it is the day to distribute new inventory information, the controller 28 extracts inventory information of copying machines for each maker from the inventory data base 22 and sends that part of the inventory information which is associated with the products of the company A to the control terminal 11 of the company A from the communication section 24 via the network NW (step S2).

The control terminal 11 of the company A receives inventory information of the copying machines of its own company A that has sent from the exchange assisting system 21 (step S3). This inventory information is output from the control terminal 11 of the company A, and a person in charge in the company A prepares list data of desired copying machines to be shipped from the exchange center 20 and collected (desired goods-to-ship data) based on the output inventory information. The control terminal 11 sends the prepared desired goods-to-ship data to the exchange assisting system 21 via the network NW (step S4).

The communication section 24 of the exchange assisting system 21 receives the desired goods-to-ship data sent from the company A (step S5). The controller 28 prepares delivering-out information from the received desired goods-to-ship data and inventory data stored in the inventory data base 22 and registers the delivering-out information in the delivering-out information data base 23 (step S6). Then, the exchange center 20 waits for the company A to actually come to pick up the copying machines that the company A wanted to be shipped out.

In case where the company A has copying machines of other companies that are collected from the business entity 30, the person in charge in the company A prepares list data of desired copying machines to be stored in the exchange center 20 (desired goods-to-be-stocked data). The control terminal 11 sends the prepared desired goods-to-be-stocked data to the exchange assisting system 21 via the network NW (step S7).

The communication section 24 of the exchange assisting system 21 receives the desired goods-to-be-stocked data sent from the company A (step S8). This desired goods-to-be-stocked data is to be stored in the memory section 25 and is displayed on the display section 26 so that a worker can see it or is printed out on a sheet of paper to be given to the worker. The exchange center 20 waits for the company A to actually bring in the copying machines that the company A wanted to be stored. The following description will be given on the premise that the company A wanted to bring in and bring out copying machines on the same day.

When the date desired by the company A for storage and shipment comes, a track of the company A carries copying machines desired to be stored and comes to the exchange center 20. A worker at the exchange center 20 collates the copying machines actually brought in with desired goods-to-be-stocked data and settles the storage if the copying machines are the right ones for storage. That is, the worker inputs information about the brought-in copying machines (including a storage block) through the input section 27 by referring to the desired goods-to-be-stocked data (step S9). Based on the input information, the controller 28 updates the contents of the inventory data base 22 (step S10). This completes the storage process.

Further, the worker at the exchange center 20 inputs a predetermined instruction through the input section 27 to read delivering-out information of the company A of that day from the delivering-out information data base 23 and display the delivering-out information on the display section 26. Then, the worker collects the copying machines that are wanted to be shipped out from associated blocks in the exchange center 20 based on the displayed delivering-out information and loads the machines on the track of the company A. Then, the worker inputs the individual copying machines having been shipped through the input section 27 (step S11). In response to the input, the controller 28 updates the contents of the inventory data base 22 that are associated with the shipped copying machines (particularly, the quantity of goods in stock) (step S12). This completes the shipping process. The exchange assisting system 21 returns to the process of step S1 again and waits for the date of distribution of next inventory information to come.

Note that the control terminal 11 of the company A has also sent the same desired goods-to-be-stocked data and desired goods-to-ship data as having been sent to the exchange assisting system 21 to the transport terminal 13 via the network nw. The transport terminal 13 arranges for a track based on the desired goods-to-be-stocked data and desired goods-to-ship data received from the control terminal 11 so that the above-described storage and shipment of copying machines are possible. Further, the control terminal 11 of the company A has also sent the same desired goods-to-ship data as having been sent to the exchange assisting system 21 to the dismantler terminal 12 via the network nw. The dismantler terminal 12 manages the transmitted desired goods-to-ship data to be ready for copying machines of its own company A which are carried on the track arranged at the transporting department.

As described above, the exchange center 20 is provided which can store copying machines of different makers and the network system including the exchange assisting system 21 is used, thereby facilitating exchanging of copying machines that each maker 10 has traded in from the business entity 30. Accordingly, each maker 10 can dismantle its own copying machines to reuse or recycle the dismantled parts. It is therefore possible to effectively use copying machines which have been disused by the business entity 30 without disposing them as wastes.

The invention is not limited to this embodiment, but may be modified and applied in various manners. The following will discuss modifications of the embodiment which can be adapted to the invention.

In the embodiment, information about inventory goods stored in the exchange center 20 is sent to the control terminal 11 of each maker 10 from the exchange assisting system 21 via the network NW. The requests for storage and shipment of copying machines made by each maker 10 are sent via the network NW to the exchange assisting system 21 located in the exchange center 20 from the control terminal 11. The exchange of such information may however be carried out by facsimile, mail or the like. In this case, each piece of information sent to the exchange center 20 has only to be input through the input section 27 by an operator.

In the embodiment, the inventory data base 22 manages the quantity of copying machines by the model number of each machine and the quantity of the stored copying machines is renewed by the actually storage in and shipment out of the exchange center 20. Alternatively, individual products may be managed by product numbers. In this case, information about each copying machine may be registered in the inventory data base 22 upon its storage in the exchange center 20 and may be deleted from the inventory data base 22 in response to shipment. Alternatively, information about each copying machine may be registered in the inventory data base 22 when a storage request is made from the control terminal 11 of each maker 10 and flags respectively corresponding to storage and shipment may be set when storage and shipment are made.

Further, when desired goods-to-be-stocked data is sent from the control terminal 11 of each maker 10, the exchange assisting system 21 may prepare delivering-in information like delivering-out information corresponding to the aforementioned desired goods-to-ship data and register the delivering-in information in a delivering-in information data base separately provided. When there is an actual storage, the worker should display the delivering-in information, registered in the delivering-in information data base, on the display section 26 for collation and make an input to settle the storage through the input section 27 when the copying machines have been stored properly as requested. Based on the storage settlement input, the controller 28 may store information about the copying machines that is registered in the delivering-in information data base in the inventory data base 22.

(Second Embodiment)

In the first embodiment, the exchange center is provided only at one location and every exchange of copying machines collected by the individual makers is performed at this one location. However, a plurality of places may be provided at each of which such exchange of copying machines takes place, such as for each region. In this case, centralized management of information about copying machines which are to be stored, stocked and shipped is possible at each place. The inventory data base has only to further store information about the place where copying machines are stocked or the like in association with the other information.

An exchange system according to the second embodiment of the invention based on the above viewpoint will now be discussed.

Figure 10:
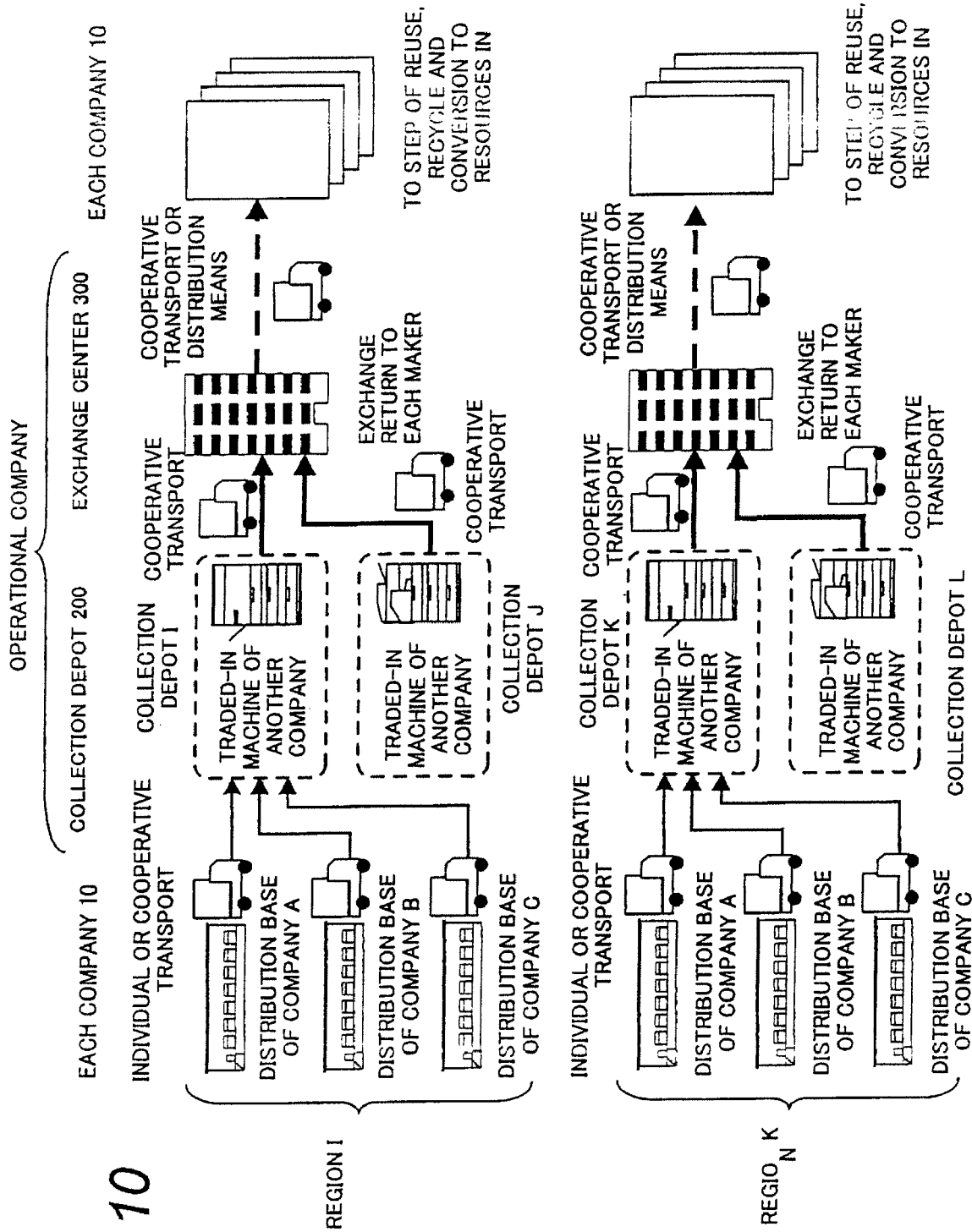
FIG. 10 is a diagram for explaining a used copying machine collecting process using a goods collection assisting system according to a second embodiment of the invention.

FIG. 10 illustrates a process which collects used copying machines by using a collected goods take-back assisting system according to the second embodiment of the invention.

At the time each of makers 10 (three companies A, B and C in the diagram) sells its own copying machine, the maker trades in a used copying machine in the purchaser for the sold one and stocks the used copying machine in a distribution base, such as a warehouse or the like of that maker. Each maker 10 brings those of the copying machines stored in the distribution base which were manufactured by other makers to a collection depot 200 provided in each region (e.g., in each prefecture). The collection depot 200 transports used copying machines brought therein to an exchange center 300. The exchange center 300 is provided one for a plurality of collection depots 200. Each maker (or company in charge of the collection work) 10 takes back used copying machines it manufactured at each exchange center 300 and delivers the used copying machines to a station (or an outside consignor) in the maker, which is in charge of reuse, recycle and resource reusage, through a distribution department of that maker.

Figure 11:
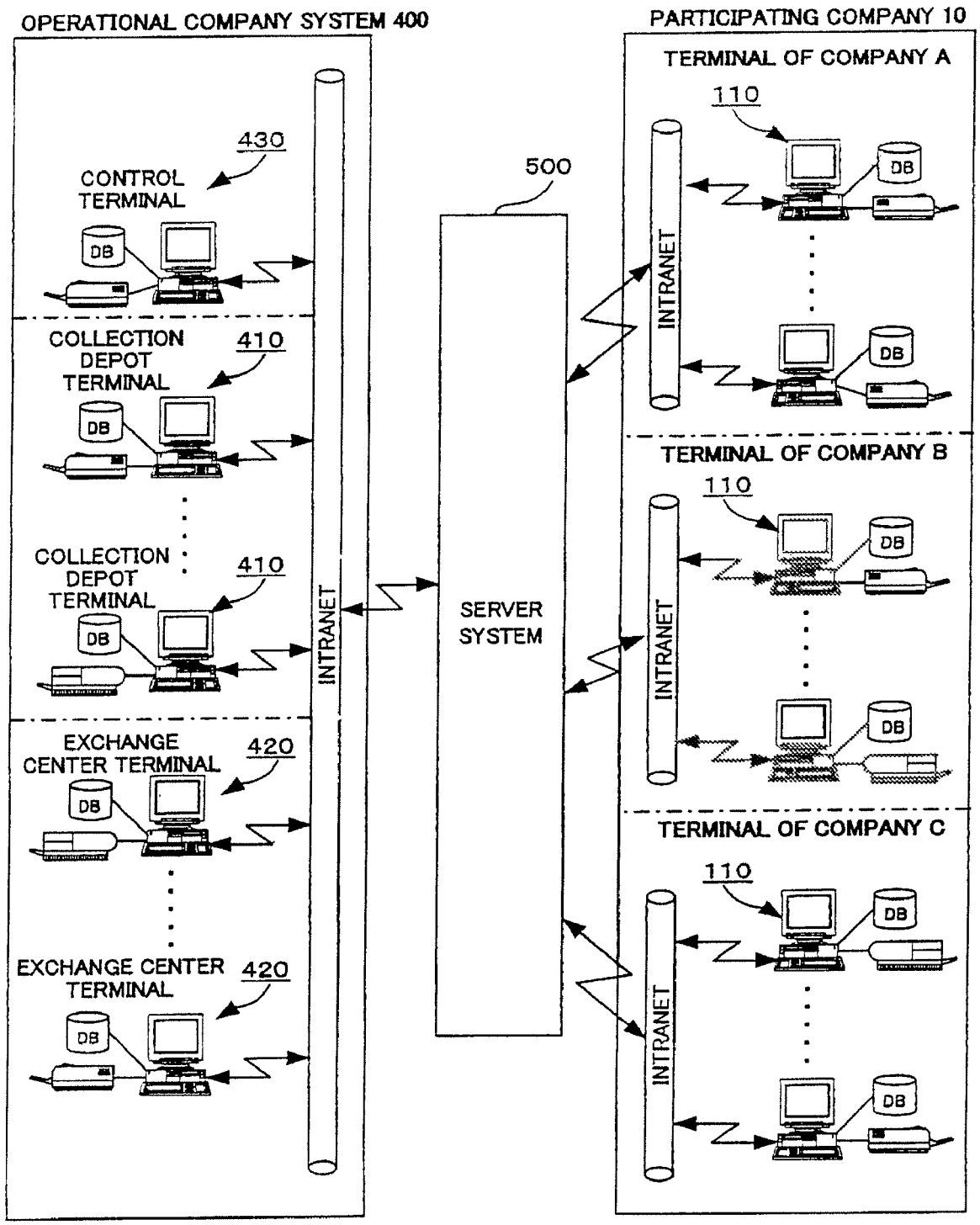
FIG. 11 is a diagram illustrating the structure of a collected machine exchange assisting system according to the second embodiment of the invention.

Referring to FIG. 11, a description will now be given of the structure of a computer network system (hereinafter referred to as "collected-machines exchange assisting system") 600 which can ensure the collecting process shown in FIG. 10.

As illustrated, the collected-machines exchange assisting system 600 comprises terminals (hereinafter called "user terminals") 110 of plural companies 10 (companies A, B and C in FIG. 11) which use the collected-machines exchange assisting system 600, an operational company system 400 and a server system 500.

The individual user terminals 110 are constructed by business terminals which are located in various departments in the associated company (hereinafter also referred to as "local company") which collect used copying machines of the local company using the collected-machines exchange assisting system 600, and include, for example, distribution department terminals sited in individual distribution bases of each company and management department terminals sited in the general department, the accounting department and so forth. Each user terminal 110 has a computer, a data base (memory unit) and an output unit, such as a printer.

The operational company system 400 is constructed by a computer system of a company which manages the collection depots 200 and the exchange centers 300. The operational company system 400 has collection depot terminals 410 located in the respective collection depots 200, exchange center terminals 420 located in the respective exchange centers 300 and a control terminal 430 sited in the main office or the like.

Figure 12:
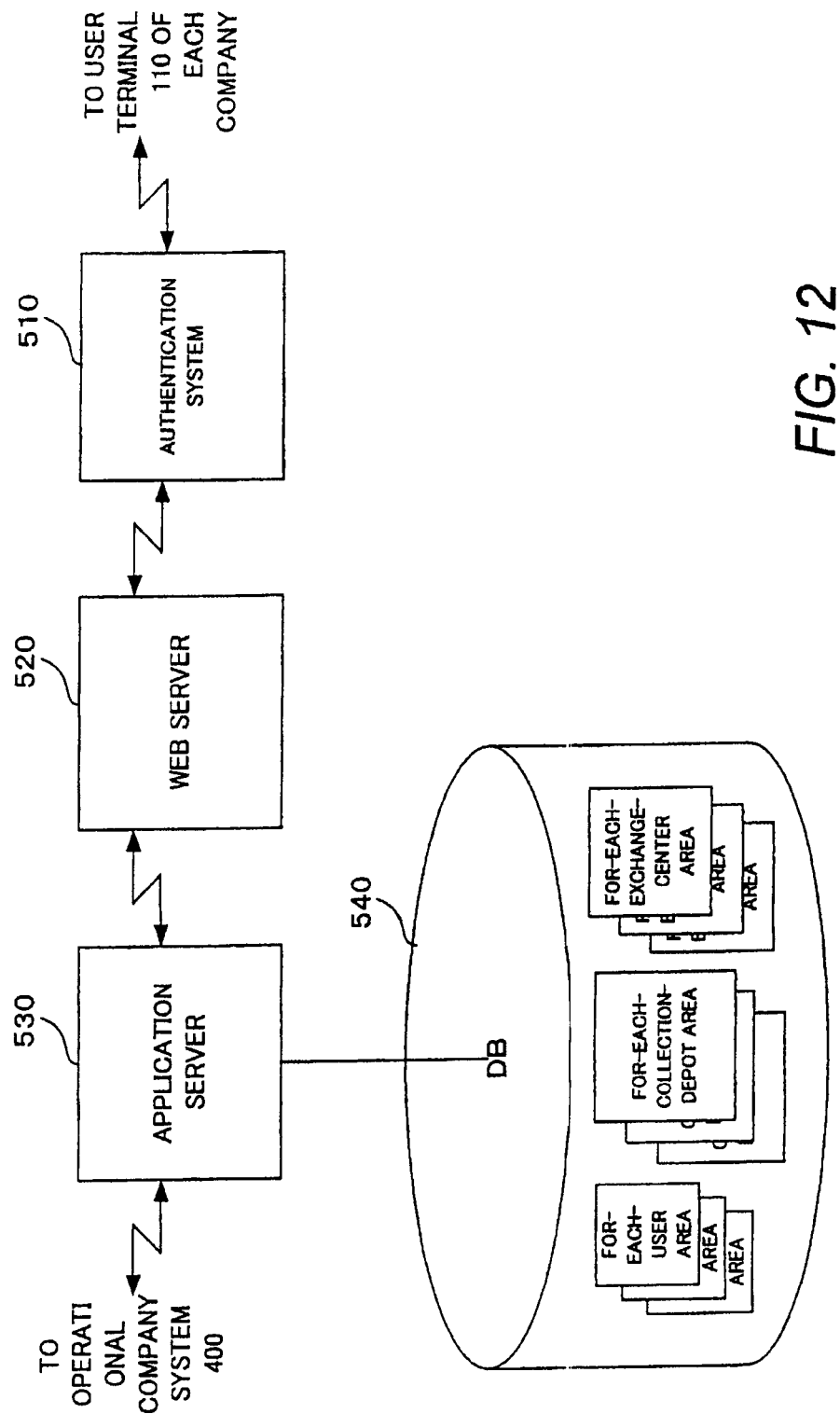
FIG. 12 is a diagram showing the structure of a server system shown in FIG. 11.

The server system 500 centrally manages collected machines, from the bringing-in of collected machines to exchange thereof. The server system 500 has an authentication system 510, a Web server 520 and an application server 530, as shown in FIG. 12.

The authentication system 510 authenticates an accessing person. A user ID (company code) and a password are assigned to a user who has the right to use the collected-machines exchange assisting system 600. Further, a branch number (sub ID) is assigned to each department or station of the user.

The user ID (company code), password and user name (company name) that are assigned to each user and the branch numbers and station (department) names are preregistered in the authentication system 510 in association with one another as shown in FIG. 13A. Those pieces of data, like the ordinary user ED and password of a computer system, can be corrected and changed as needed.

The authentication system 510 is connected to the user terminal 110 via a network, such as the Internet. The authentication system 510 discriminates whether or not the accessing person is a legitimate user by discriminating if a pair of the ID and password input on the authentication screen match with a preregistered one, and specifies the station or department of the accessing person from the branch number of the user.

The application server 530 has a data base 540 and stores various data to be used in management, from the bringing-in of collected machines into the collection depot 200 and the exchange center 300 to the delivery, for each maker 10, each collection depot 200 and each exchange center 300. For example, as shown in FIG. 13B, the data base 540 stores information, such as (1) the management number, (2) the desired carry-in date, (3) the actual carry-in date, (4) the carry-in company, (5) the distribution means, (6) the carry-in dealer, (7) the carried-in machine maker name, (8) the company code, (9) the product name, (10) the classification, (11) the quantity, (12) memo, (13) the scheduled transporting date, (14) the actual transporting date and (15) other of each collected machine. As shown in FIG. 13C, the application server 530 also stores information indicating 1) the management number, (2) the desired carry-in date, (3) the actual carry-in date, (4) the carry-in company, (5) the distribution means, (6) the carry-in dealer, (7) the carried-in machine maker name, (8) the company code, (9) the product name, (10) the classification, (11) the quantity, (12) memo, (13) the scheduled transporting date, (14) the actual transporting date and (15) other for the depot 200 with respect to each collected machine, and information indicating (1) the management number, (2) the scheduled transporting date, (3) the actual transporting date, (4) the machine number, (5) the counter, (6) the volume classification, (7) the incidental expense (1), (8) the incidental expense (2), (9) the incidental expense (3), (10) the incidental shipping expense (4), (11) the incidental expense (5), (12) the scheduled shipping date, (13) the actual delivery date, and (14) and so forth for the exchange center 300.

The application server 530 prepares various documents from data stored in the data base 540 and stores the documents in the data base 540 and externally outputs them.

The Web server 520 is a system which interfaces the application server 530 with the user terminals 110. The Web server 520 provides a user with data from the application server 530 in the form of a Web page and transmits data input by the user on the Web page to the application server 530.

Figure 14:
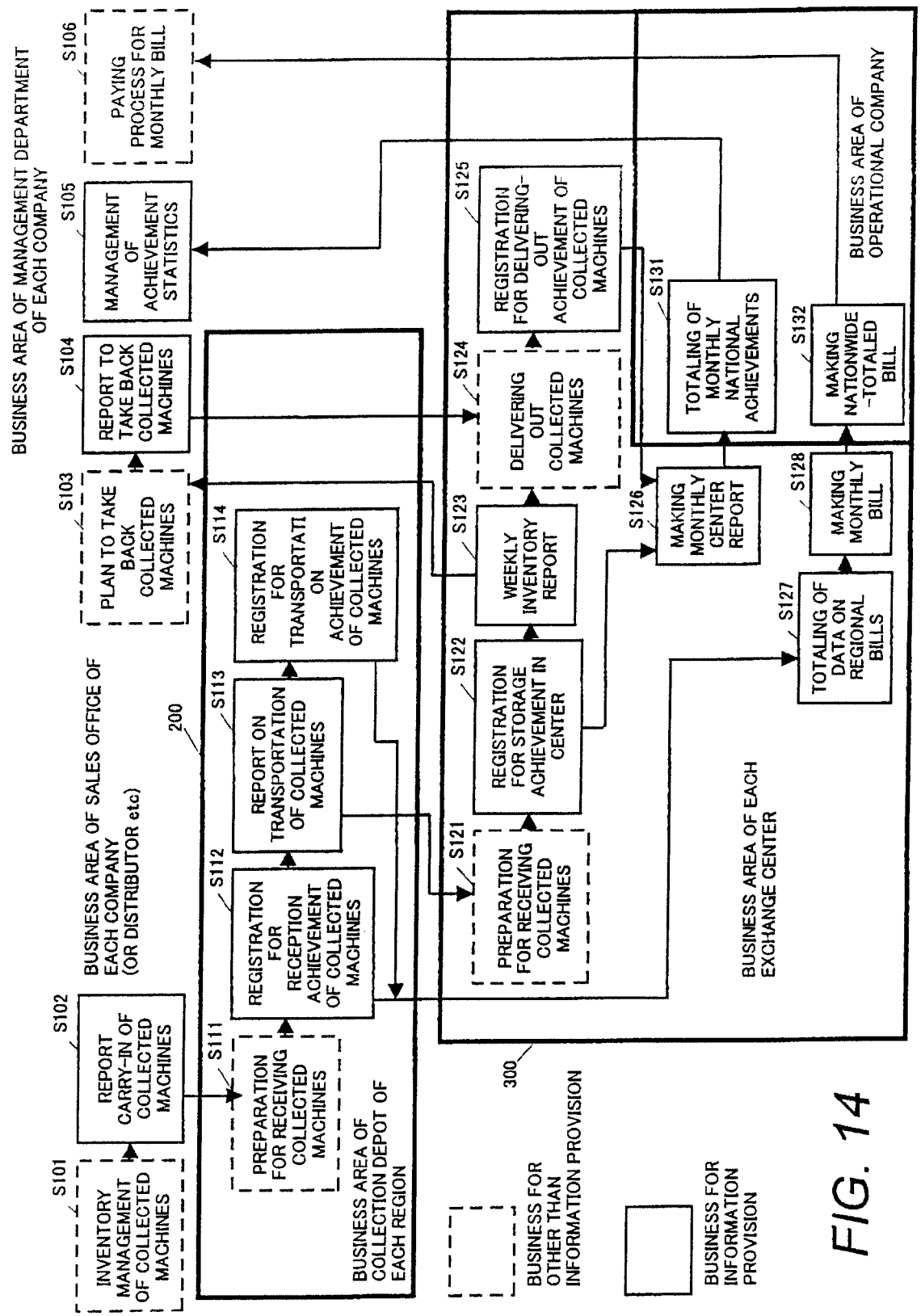
FIG. 14 is a diagram for explaining a business process of the collected machine exchange assisting system according to the second embodiment of the invention.

FIG. 14 is a diagram illustrating the general view of the business process of the collected-machines exchange assisting system according to the second embodiment.

As illustrated, sales offices and distribution subsidiary companies of a company which participates in this system collect used copying machines at the time of selling copying machines of this company, delivers the collected machines (collected copying machines) to a distribution base, such as a distribution center, and manage the inventories (step S101). A sales office or the like of each company notifies the bring-in (delivering-in) schedule of collected machines to the collection depot 200 that manages the sales office via the server system 500, regularly or when a given quantity of inventory goods is reached, by operating its own user terminal 110 (step S102).

In response to the notification from the sales office or the like, each collection depot 200 starts preparing for reception of the collected machines (step S111). When the collected machines are brought in from the sales office, the collection depot 200 registers information about the brought-in collected machines into the application server 530 through the collection depot terminal 410 (step S112). When the quantity of the collected machines in stock reaches a given value (or the inventory of the collected machines occurs regularly), the person in charge of the collection depot 200 makes a transporting plan to transport the collected machines to the exchange center 300 and notifies the exchange center 300 of the transporting plan (step S113). As the collected machines are actually transported to the exchange center 300, the transportation achievement of the collected machines is registered in the application server 530 (step S114). Further, totaled information of the achievement of reception of the collected machines at the local collection depot 200 and the achievement of transportation of the collected machines are sent to the exchange center 300 regularly (steps S112 and S114).

In response to the collected-machine transporting report from the collection depot 200, each exchange center 300 starts preparing for reception of collected machines (step S121). When the collected machines are actually in stock, the person in charge of the exchange center 300 registers information about the stocked collected machines into the application server 530 by manipulating the exchange center terminal 420 (step S122). The person in charge of the exchange center 300 notifies the take-back station of each company of a report indicating the inventory state of collected machines of each company regularly, e.g., weekly (step S123).

The person in charge of the take-back work in each company settles on a take-back plan for collected machines based on the inventory reports sent one after another from the exchange center 300 (step S103). The person in charge of the take-back work in each company reports the settled take-back plan to the exchange center 300 (step S104).

Upon reception of the collected-machine transporting report from each company, the person in charge of each exchange center 300 does a delivering out work (work to deliver copying machines in stock to that company (step S124). When collected machines are actually delivered to each company, the person in charge of the exchange center 300 registers the delivering-out achievement of the collected machines in the application server 530 (step S125).

The person in charge of the exchange center 300 makes a report on the storage achievement and delivering-out achievement regularly, e.g., monthly (step S126). Based on the collected-machines reception achievement and collected-machines transportation achievement reported by each collection depot 200, that person in charge totals another achievement data of the collection depot 200 (step S127) and makes a monthly bill (step S128).

A person in charge of management of each operational company totals nationwide month achievements based on a monthly report from the exchange center 300 by manipulating the collection depot terminal 410 (step S131). This person in charge also makes a nationwide-totaled bill based on the nationwide month achievements and the monthly bill from the collection depot 200 (step S132).

Further, the person in charge of management performs an achievement statistics process based on the totaled nationwide month achievements (step S105), and performs a paying process for the monthly bill prepared in the nationwide totaled bill creating process of the operational company system 400 (step S106).

The collected-machines exchange process will specifically be described case by case by referring to the diagrams.

1. Carry-In of Collected Machines of Other Companies to the Collection Depot 200 from Each Company 10

First, a description will be given of a process of carrying collected machines of other companies into the collection depot 200 from each company 10.

Figure 16:
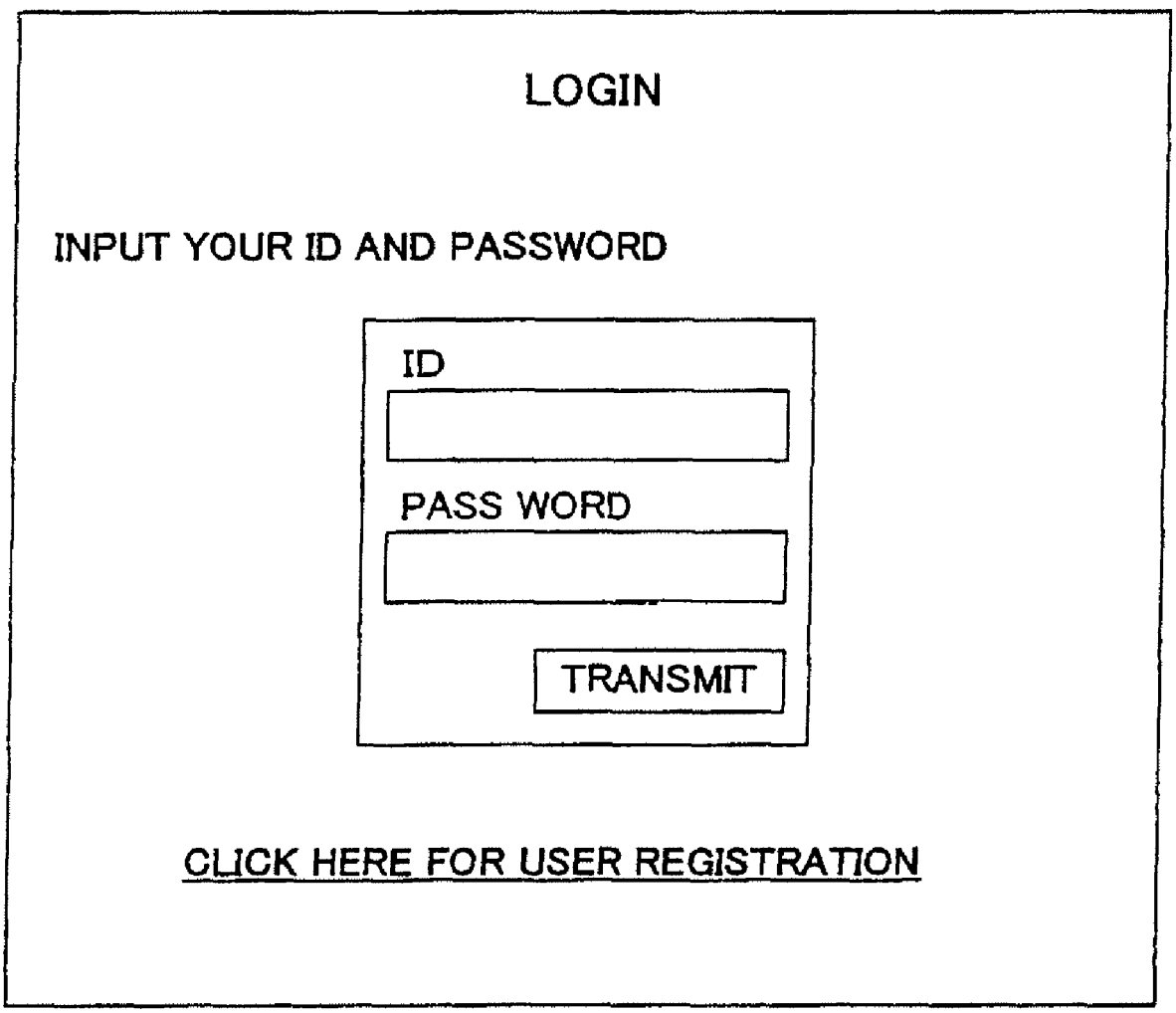
FIG. 16 is a diagram showing a display example of a log-in screen which is transmitted in the process illustrated in FIG. 15.

A person in charge of machine collection in each company accesses the server system 500 from the local user terminal 110. The Web server 520 of the server system 500 sends a predetermined log-in screen shown in FIG. 16 to the user terminal 110 in response to the access. The person in charge inputs the ID and password of the local company on the log-in screen displayed on the user terminal 110.

The authentication system 510 determines whether or not the pair of the input ID and password is registered as a user, and notifies the Web server 520 of an authentication acknowledgement if the pair is registered. In response to the authentication acknowledgement, the Web server 520 sends a process selection screen shown in FIG. 17 to the user terminal 110.

Figure 18:
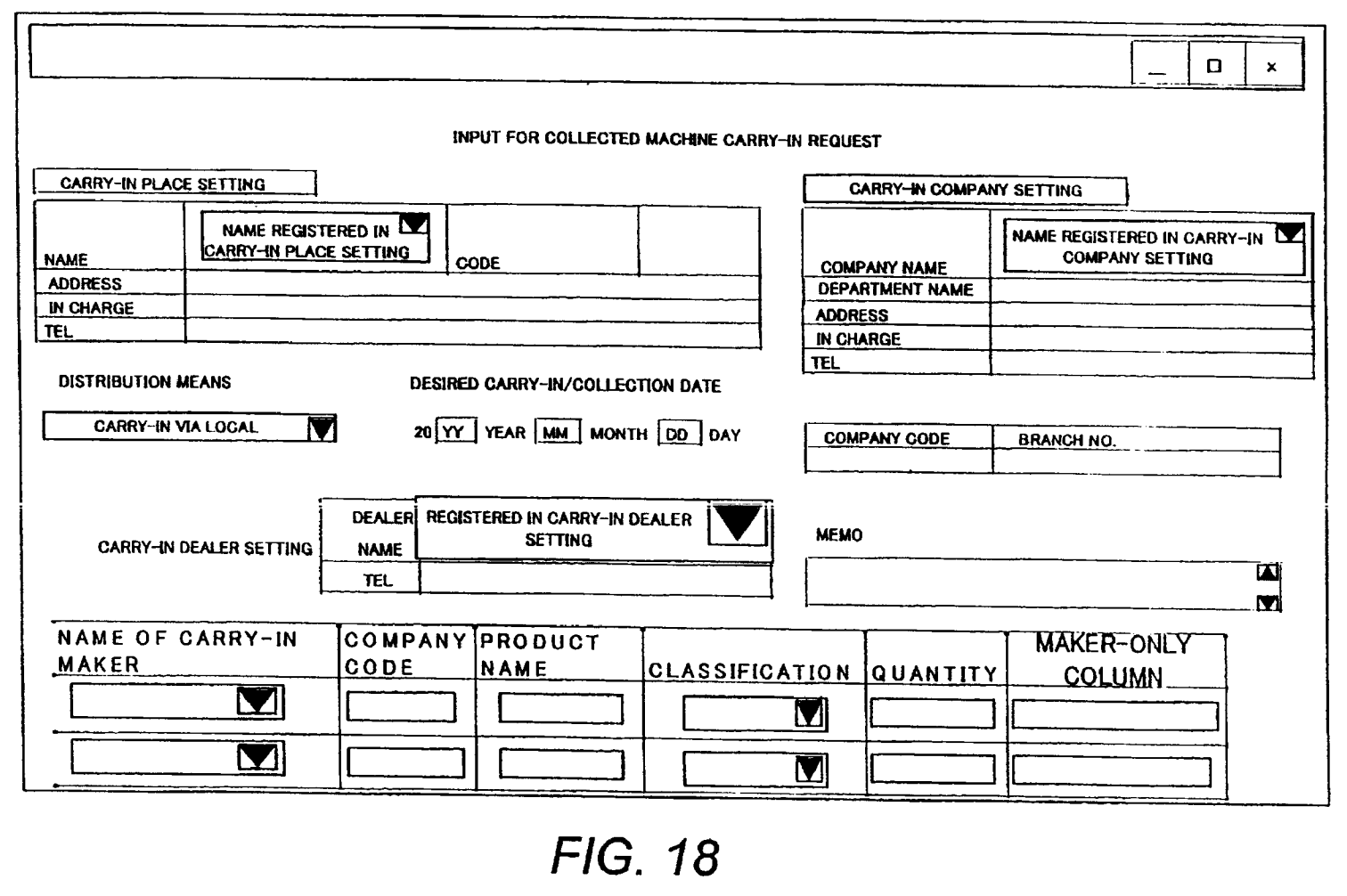

The person in charge of machine collection selects the "Arrangement for carrying in collected machines of other companies" on the process selection screen. In response to this operation, the Web server 520 synthesizes a "collected-machine carry-in request input" screen shown in FIG. 18 and sends it to the user terminal 110.

The person in charge enters the following information in the input screen displayed on the user terminal 110 (step 201 in FIG. 15):

(1) information that specifies the collection depot in which collected machines are to be brought, (2) information that specifies the company (shop) in which collected machines are to be brought and the branch number that specifies a station in charge, (3) distribution means (whether it is the transporting system of the local company or a request to an outside transporter; the name of the outside transporter in the latter case), (4) the desired carry-in date, and (5) information that specifies the collected machines, such as the company code (ID), product name (machine type name), classification (machine, accessory and expendable), the quantity and the presence of a stain or scratch.

Information, such as the carry-in place, carry-in company and carry-in dealer may be stored in association with the ID of the carry-in company so that the Web server 520 reads corresponding information based on the ID entered at the log-in time and sets it as default information in the input screen.

When the person in charge enters those pieces of information and clicks the "Register" button, the user terminal 110 sends the input information to the Web server 520.

The Web server 520 provides the application server 530 with the transmitted information. Based on the information, the application server 530 prepares a carry-in request F01 of the form as shown in FIG. 19 for the collection depot 200, sends the request to the associated collection depot 200 and registers the request in a specific area in the data base 540 for the collection depot 200.

The application server 530 secures an area for each collected machine shown on the carry-in request F01 in the area for the corresponding collection depot 200 and registers input information as shown in FIG. 13B. At this time, unsettled information is left unregistered. For each collected machine, the management number (a unique number in the collection depot) is given and added in a data record.

In the collection depot 200, the collation depot terminal 410 receives the carry-in request F01 transmitted from the application server 530 and outputs (prints or displays) the request (step S211). Subsequently, preparation for reception of the collected machines is started based on the carry-in request F01 (step S212).

When each sales office actually brings collected machines into the collection depot 200, a person in charge of the collection depot 200 registers the collected-machine receiving achievement in the server system 500 (step S213).

Figure 20:
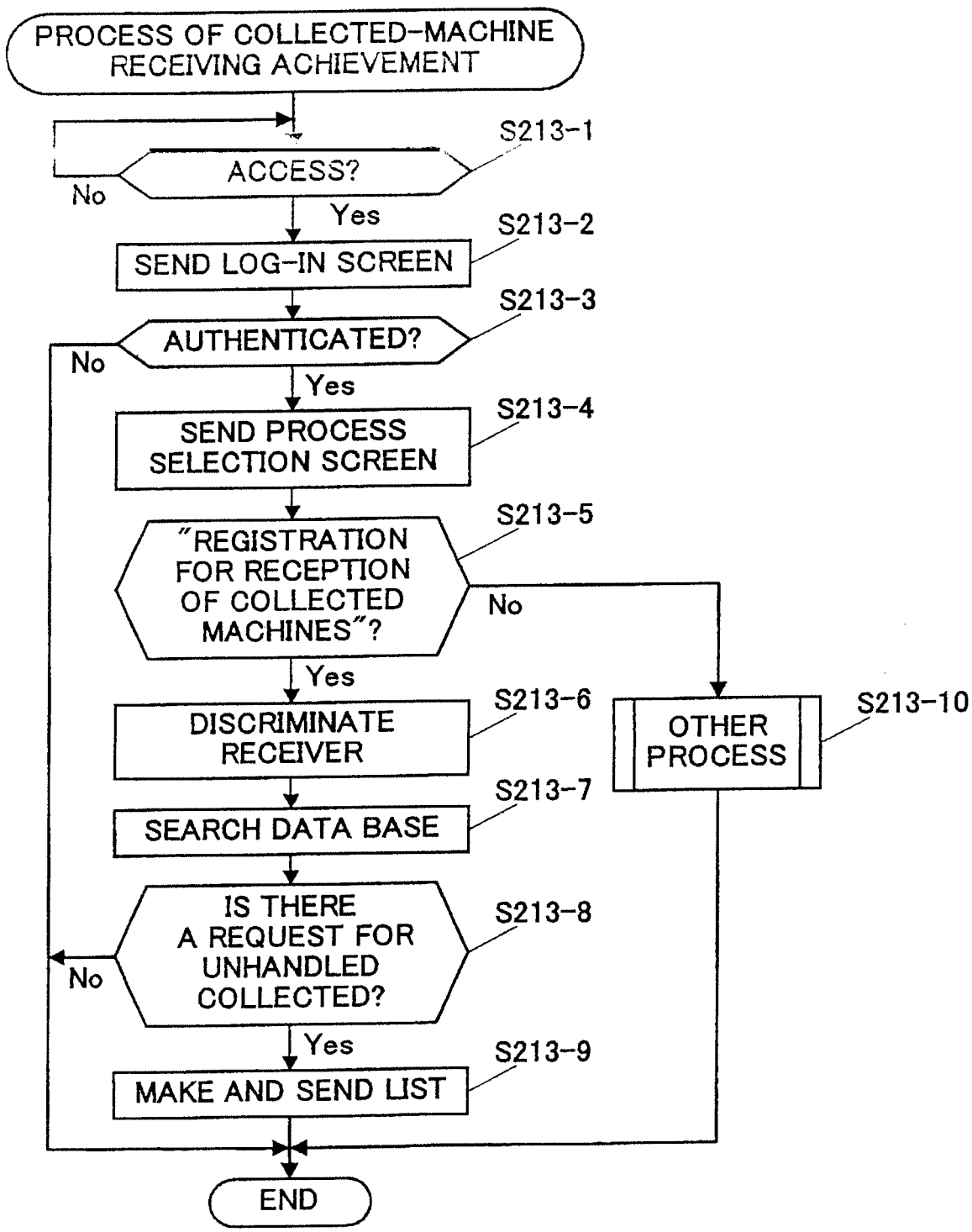
FIG. 20 is a diagram for explaining a process of registering a collected-machine receiving achievement according to the second embodiment of the invention.

The operation of the server system 500 in this registration process will be discussed by referring to a flowchart in FIG. 20. First, when the person in charge of the collection depot 200 accesses the server system 500 using the collection depot terminal 410 (YES in step S213-1), the server system 500 sends a log-in screen to the collection depot terminal 410 (step S213-2).

The person in charge enters ID and a password into the collection depot terminal 410 and sends it to the server system 500. The server system 500 performs an authentication process on the received ID information to discriminate whether or not the user is a legitimate user (step S213-3). When the authentication is unsuccessful (NO in step S213-3), the server system 500 terminates the process.

When the authentication is successful (YES in step S213-3), on the other hand, the server system 500 sends the process selection screen shown in FIG. 17 to the collection depot terminal 410 (step S213-4).

When "Registration for reception of collected machines" is selected on the process selection screen (YES in step S213-5), the server system 500 discriminates whether or not the receiver is a "collection depot" or "exchange center" based on the ID information received in step S213-3 (step S213-6). In this example, the server system 500 discriminates that the receiver is a "collection depot", searches the data base 540 (step S213-7) and determines whether or not "carry-in requests" addressed to this collection depot 200 include a carry-in request which contains any unhandled collected machine (step S213-8).

When an item other than "Registration for reception of collected machines" is selected on the process selection screen (NO in step S213-5), the server system 500 executes an other process corresponding to the selected item (step S213-10).

When there is a carry-in request which contains any unhandled collected machine (YES in step S213-8), the server system 500 creates a list as shown in FIG. 21 for that request, sends the list to the collection depot terminal 410 (step S213-9), then terminates the process.

The collection depot terminal 410 displays the list (FIG. 21) received from the server system 500. The person in charge selects a proper "carry-in request" F01 from this list and displays the request on the screen of the collection depot terminal 410 as shown in FIG. 22.

The person in charge puts a check mark "X" on the collected machines in the list that have actually been brought in. Arbitrary information is input in text in the column of "Notes" as needed. When the person in charge completes the input and clicks the "Send" button, the input contents to the collection depot terminal 410 are sent to the application server 530. The application server 530 produces, from the transmitted input information, a confirmation screen, as exemplified in FIG. 23, for allowing a user to check the input contents and sends the screen to the collection depot terminal 410 to display it.

When the operator checks the input contents and finds that the input contents are correct, the operator clicks the "Set" button. In case where there is any item to be corrected or amended, the operator clicks the "Return" button and returns to the previous screen to make some corrections, then clicks the "Send" button again.

In response to the clicking of the "Set" button, the application server 530 adds the actual "receiving date" and "Notes" in the column of the selected collected machines in the "carry-in request" stored in the data base 540. The "actual receiving date" and "Notes" are added in the collected-machine history data (FIG. 13B) of the associated collected machines in the memory area for the collection depot 200.

With respect to each collected machine which has undergone the registration of the collected-machine receiving achievement, the collection depot terminal 410 prints a stick-on slip F02 as shown in FIG. 24A on a seal-like label.

The stick-on slip F02, which will stick on each collected machine brought in, shows information, such as the storage place, the storing date, the management number, the name and code of the carry-in company, the name and code of the take-back company, the product name, the product classification, the appearance conditions and notes. The storage place is the name of the collection depot where the collected machine is stocked. The storing date is the date which has been registered at the time of registering the carry-in achievement. The take-back company name and the take-back company code are determined by the maker of the collected machine and are the name and code of the take-back company (or its consignor) which will finally collect the collected machine.

The person in charge sticks the printed stick-on slip F02 on each collected machine.

2. Transportation of Collected Machines from Collection Depot to Exchange Center The person in charge of the collection depot 200 settles on a transporting plan to transport received collected machines to the exchange center 300 that controls the collection depot 200 and registers the plan in the data base 540 (step S204). That is, which collected machine to transport to the exchange center 300 and when and how that collected machine is transported there are determined and are registered in the data base 540.

Figure 15:
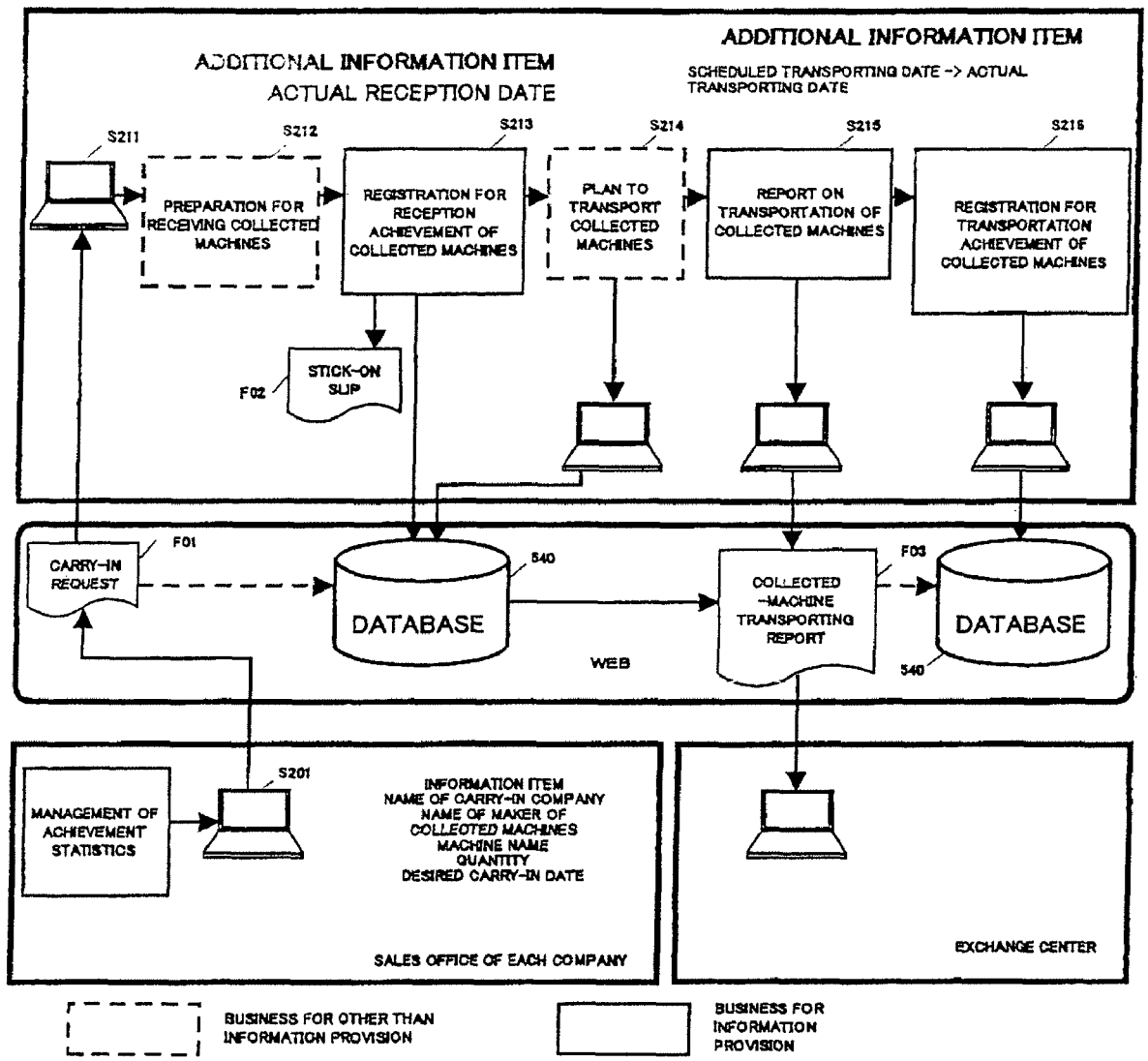
FIG. 15 is a diagram for explaining a process of delivering collected machines produced by other makers in the process illustrated in FIG. 14.

Next, the person in charge of the collection depot 200 creates a collected-machine transporting report F03 as shown in FIG. 25 to notify the exchange center 300 of the transportation destination of the settled transporting plan (step S215 in FIG. 15).

To create the collected-machine transporting report F03, the person in charge accesses the server system 500 and performs a log-in process. The authentication system 510 determines whether or not a pair of the ID and password input is preregistered, and sends the process selection screen (FIG.

17) to the collection depot terminal 410. The person in charge selects "Depot→center transporting report" on the process selection screen.

In response to this operation, the application server 530 edits and creates the screen for making the collected-machine transporting report shown in FIG. 26 and sends the screen to the collection depot terminal 410.

The screen includes a list of the name of the collection depot, the name of the exchange center that controls the collection depot and collected-machine information about collected machines that are stocked in the collection depot at present. The application server 530 specifies the collection depot name from the ID input at the log-in time and specifies the exchange center name to the name of the exchange center that controls the collection depot. The application server 530 extracts those of the collected machines registered in the data base 540 whose "carry-in dates" are registered but whose "scheduled transporting dates" are unregistered and makes a list of the extracted collected machined as collected-machine information. For each collected machine, the collected-machine information includes information, such as the carry-in company, the take-back company, the product name, the product classification, the quantity, the management number and the appearance information.

The person in charge of the collection depot enters the date in the column of "Scheduled transporting date", and specifies the type of the vehicle and the vehicle number or the like, if possible, in the column of "Transporting means/car no." in case where the type of the vehicle can be specified. Further, the person in charge puts a check mark "X" on those collected machines in the displayed list of collected machines in stock which are to be transported this time. Necessary memo items are input in the column of "Memo" as needed.

When the input is completed and the "Send" button is clicked, the collection depot terminal 410 sends the input contents to the application server 530. The application server 530 generates, from the transmitted input information, a confirmation screen, as exemplified in FIG. 27, for allowing a user to check the input contents. The application server 530 sends the generated confirmation screen to the collection depot terminal 410 to display it.

When the operator checks the contents on the confirmation screen and finds that the input contents are correct, the operator clicks the "Confirm" button. In response to the clicking operation, the application server 530 stores the contents on the confirmation input screen as the collected-machine transporting report F03 (FIG. 25) in the memory area for the collection depot 200 in the data base 540. The application server 530 further adds the scheduled transporting date to collected-machine history data (FIG. 13B).

The person in charge can print out the collected-machine transporting report F03 as needed. The person in charge of the transporting process of the collection depot 200 executes the transporting work by referring to the printed collected-machine transporting report F03.

When actually delivering collected machines to the exchange center 300, the person in charge of the collection depot 200 registers the collected-machine transporting achievement (step S216 in FIG. 15). To make this registration, the person in charge of the collection depot 200 accesses the application server 530 and performs a log-in process. After the authentication process, the application server 530 provides the process selection screen (FIG. 17). The person in charge selects "Registration for transportation achievement" on the process selection screen.

In response to this operation, the application server 530 discriminates those of "collected-machine transporting reports" F03 registered in the collection depot area of the collection depot 200 which include items whose achievements are unregistered, generates a list of the reports and sends the list to the collection depot terminal 410.

The person in charge of the collection depot 200 selects an arbitrary "collected-machine transporting report" from the list. The application server 530 reads the selected "collected-machine transporting report". Next, the application server 530 extracts information on collected machines whose transportation achievements are not registered, synthesizes a screen for registration for transportation achievement, and sends the screen to the collection depot terminal 410.

The collection depot terminal 410 displays the screen for registration for transportation achievement. The person in charge puts a check mark "X" on those of the collected machines in the displayed list which have actually transported this time, and designates the actual transporting date. When the person in charge completes the input and clicks the "Send" button, the input contents are sent to the application server 530. The application server 530 generates, from the transmitted input information, a confirmation screen for allowing a user to check the input contents and sends the screen to the collection depot terminal 410 to display it.

When the operator checks the input contents and finds that the input contents are correct, the operator clicks the "Confirm" button. In response to this clicking operation, the application server 530 adds the actual transporting date to the data base 540. That is, the actual transporting date is registered in the column of "actual transporting date" in the collected-machine history data (FIG. 13B). Further, a flag indicating the transportation having been done and the transporting date (the date may be set as a flag) are registered for each collected machine on each collected-machine transporting report.

Through the above-described process, various information on every collected machine delivered to the exchange center 300 via each collection depot, from the carry-in information to carry-out information, (the scheduled carry-in date, the actual carry-in date, the transporting method, the transporting means, the carry-in company, the take-back company, the product name, the product classification, the quantity, the management number, the appearance conditions, the scheduled transporting date, the transporting method, the actual transporting date, etc.) are registered in the data base 540 in association with one another. Further, the "carry-in request" F01 that is created at a sales office of each company and sent to the collection depot 200 and the "collected-machine transporting report" F03 prepared in the collection depot are stored.

3. Operation of Exchange Center System

The operation of each exchange center system will now be discussed by referring to the process flow in FIG. 28.

The person in charge of the exchange center 300 accesses the application server 530, reads the collected-machine transporting report F03 addressed to the local exchange center (step S221 in FIG. 28), and prints the reports as needed. The person in charge of the exchange center 300 prepares for reception of collected machines by referring to the collected-machine transporting report F03 (step S222).

The application server 530 reads information about the collected machines that have been accepted this time from the collation depot area in the data base 540, and registers the information into the associated exchange center area in the data base 540.

As a collected machine is actually transported from the collection depot 200, the person in charge of the exchange center 300 performs jobs, such as checking the machine number of the collected machine (the number that is given by the maker), checking the counter (the counter that indicates the number of copied/printed sheets), detachment of accessories and checking the volume (size) (step S223).

Figure 29:
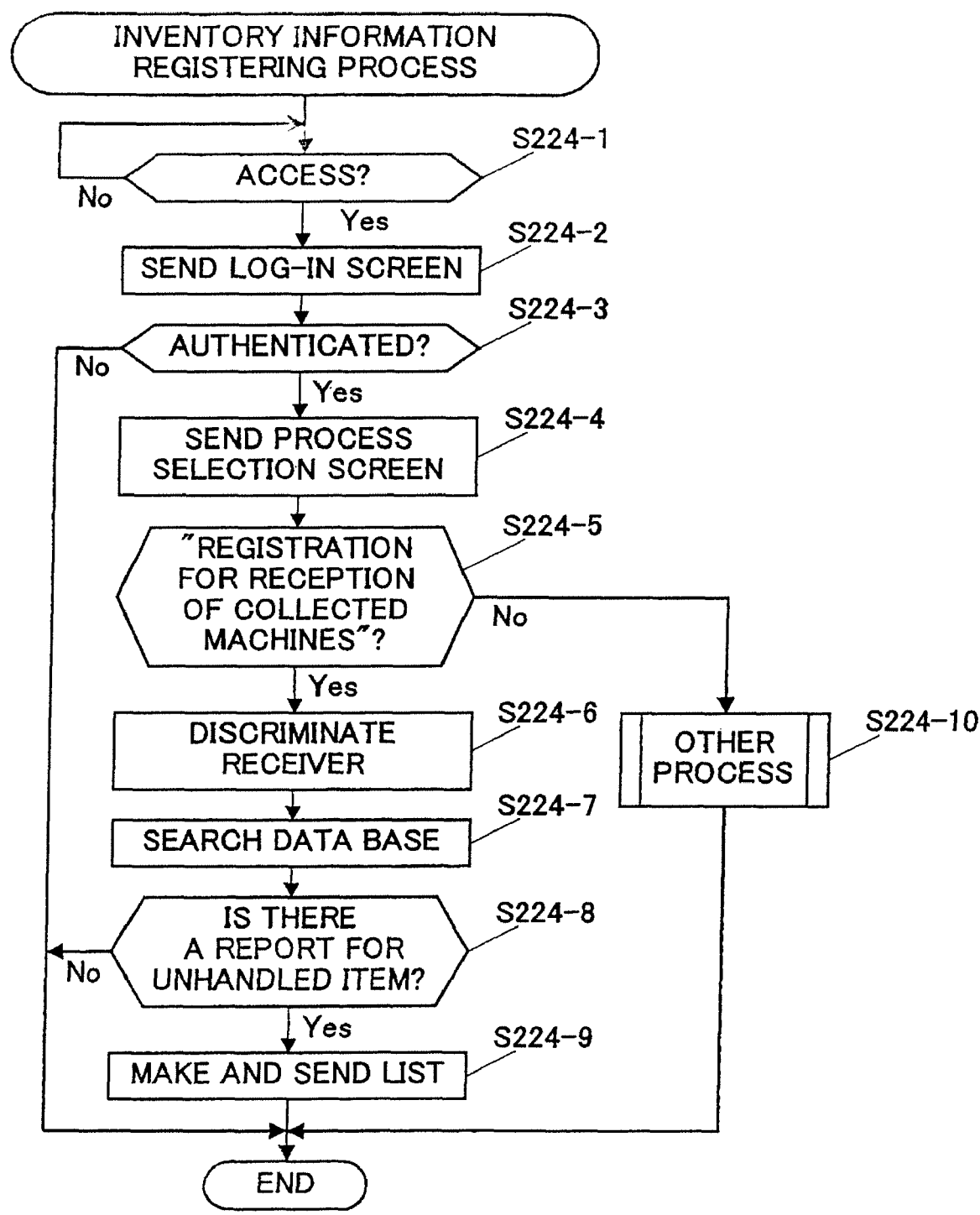
FIG. 29 is a diagram for explaining an inventory information registering process according to the second embodiment of the invention.

Next, the person in charge executes a process of registering inventory information in the data base 540 by manipulating the exchange center terminal 420 (step S224). The operation of the application server 530 in this registration process will be discussed by referring to a flowchart in FIG. 29.

First, when the person in charge accesses the application server 530 using the exchange center terminal 420 (YES in step S224-1), the application server 530 sends a log-in screen to the exchange center terminal 420 (step S224-2).

The person in charge enters ID information into the exchange center terminal 420 and sends it to the application server 530. The application server 530 performs an authentication process on the received ID and password to discriminate whether or not the user is a legitimate user (step S224-3). When the authentication is unsuccessful (NO in step S224-3), the process is terminated.

When the authentication is successful (YES in step S224-3), on the other hand, the application server 530 sends the process selection screen shown in FIG. 17 to the exchange center terminal 420 (step S224-4).

When "Registration for reception of collected machines" is selected on the process selection screen (YES in step S224-5), the application server 530 discriminates whether or not the receiver is a "collection depot" or "exchange center" based on the ID information received in step S224-3 (step S224-6). In this example, the application server 530 discriminates that the receiver is an "exchange center", searches the data base 540 (step S224-7) and determines whether or not there is a collected-machine transporting report F03 including an unhandled item which is scheduled to be brought in the exchange center 300 (step S224-8).

When an item other than "Registration for reception of collected machines" is selected on the process selection screen (NO in step S224-5), the application server 530 executes an other process corresponding to the selected item (step S224-10).

When there is a collected-machine transporting report F03 which contains any unhandled item (YES in step S224-8), the application server 530 creates a list as shown in FIG. 21 for that report F03, sends the list to the exchange center terminal 420 (step S224-9), then terminates the process.

The exchange center terminal 420 displays the collected-machine transporting report list received from the application server 530 as shown in FIG. 30. The person in charge selects an arbitrary collected-machine transporting report F03. The application server 530 arranges the selected collected-machine transporting report to synthesize a screen for registration for reception of collected machines (center storage settled) shown in FIG. 31 and provides the exchange center terminal 420 with the screen This screen includes a list of information, such as the scheduled storing date for storage into the exchange center, the carry-in company, the take-out company, the product name, the classification and so forth, of each collected machine specified in the collected-machine transporting report". The screen further includes an input column for specifying the machine number, the counter, the volume classification and the incidental expense.

By manipulating the exchange center terminal 420, the person in charge puts a check mark "X" on the collected machines that have actually been brought in. The person in charge also registers, the machine number, the value of the counter, the volume classification (size), etc. In case where an incidental job is produced in accordance with the storing work, the contents are specified (selected from suggestions). For example, the process contents, such as checking the machine number and removal of the photosensitive drum, are specified.

When completing the input, the person in charge clicks the "Send" button. In response to this operation, the exchange center terminal 420 sends the input contents to the application server 530. The application server 530 generates, from the received information, a confirmation screen, as shown in FIG. 32, for allowing a user to check the input contents and sends the screen to the exchange center terminal 420 to display it.

When the operator checks the input contents and finds that the input contents are correct, the operator clicks the "Set" button. In case where there is any item to be corrected or amended, the operator clicks the "Return" button and returns to the previous screen to make some corrections, then clicks the "Send" button again.

In response to the clicking of the "Set" button, the application server 530 adds the actual "receiving date" in the column of the selected collected machines in the "transporting plan" stored in the data base 540. Information, such as the actual transporting date, the machine number, the counter, the volume classification and the incidental expense, is additionally registered in the collected-machine history data (FIG. 13C) of the associated collected machines in the memory area for the exchange center 300.

When the inventory registration is completed, the application server 530 displays a stick-on slip print screen on the exchange center terminal 420. Here, the person in charge instructs to print a stick-on slip. In response to the instruction, the exchange center terminal 420 prints a stick-on slip as shown in FIG. 24B.

The stick-on slip, which will stick on each collected machine brought in, shows information registered in the data base 540, such as the storage place, the storing date, the management number, the name and code of the carry-in company, the name and code of the take-back company, the product name and the appearance conditions. The storage place is the name of the exchange center 300 where the collected machine is stocked. The storing date is the date at which the collected machine has actually been brought in the exchange center 300. The management number is a number peculiar to the collected machine that is given for the management purpose in the exchange center 300. The carry-in company name and carry-in company code are the name and code of the carry-in company which has collected and brought the machine into the collection depot 200. The take-back company name and the take-back company code are determined by the maker of the collected machine and are the name and code of the take-back company which will finally take back the collected machine. The product classification/volume classification is information indicating the type and volume of a collected product.

The person in charge sticks the printed stick-on slip on each collected machine. As the stick-on slip F02 stuck on each collected machine in the collection depot 200, the printed stick-on slip will be stuck over the former slip.

Although the management number is set to a number specific to the exchange center 300 in order to facilitate management of inventory goods in the exchange center 300, it may be a number common to the collation depot. The management number in the exchange center 300 is given by the application server 530, for example, when reception registration is executed in the exchange center 300.

4. Making Weekly Inventory Report

Figure 28:
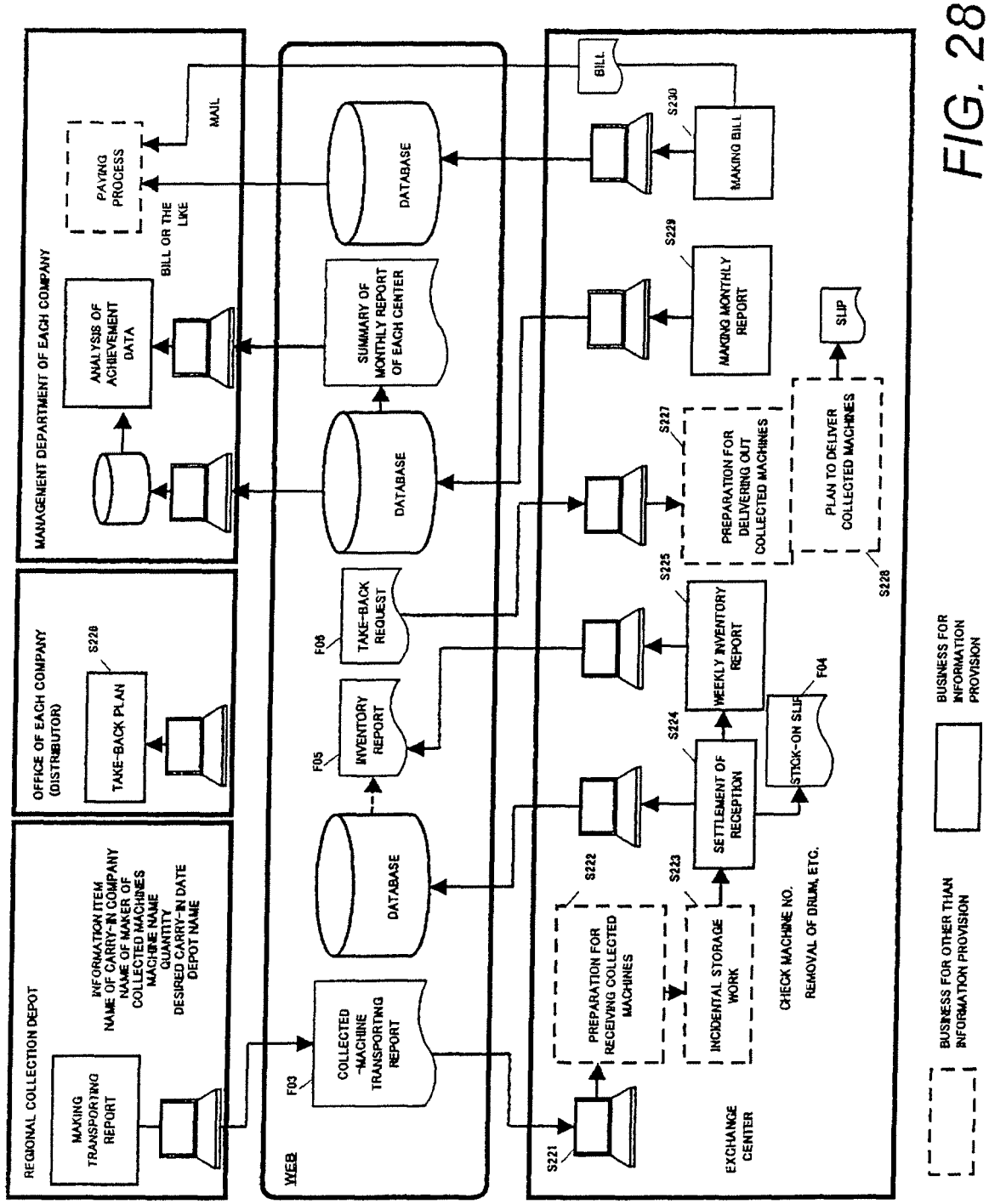
FIG. 28 is a diagram for explaining the operation of an exchange center system according to the second embodiment of the invention.

The person in charge of each exchange center 300 regularly performs a process of creating an inventory report indicating the inventory of collected machines of other companies and sending the inventory report to each company (step S225 in FIG. 28).

To report the inventory, the person in charge of the exchange center 300 accesses the application server 530 by manipulating the exchange center terminal 420 and reads the process selection screen shown in FIG. 17 after log-in. The person in charge clicks "Making inventory report".

In response to this operation, the application server 530 first determines which "exchange center" is the accessing person based on the ID input at the log-in time. The application server 530 searches the collected-machine history data stored in the area for that exchange center in the data base 540 to retrieve collected machines whose reception registration has been carried out at the exchange center 300 but whose collected-machine delivering-out achievement has not been registered, i.e., those collected machines which are in stock. Further, the retrieved collected machines are totaled for land for each take-out base to create a collected-machine inventory report F05 as shown in FIG. 33.

As exemplified in the diagram, the collected-machine inventory report F05 includes information, such as the output date, the report destination (the company/sales office which takes back collected machines), the reporter (exchange center name), the storing date for collected machines which are in stock, the product name, the management number, the quantity, the machine number, the meter, the product classification, the volume classification, the appearance conditions, the carry-in company name and the carry-in company code. The application server 530 stores the generated collected-machine inventory report F05 in the exchange center memory area and the report destination are in the data base 540. Alternatively, the application server 530 sends the collected-machine inventory report by e-mail.

This allows the exchange center 300 to know the state of the inventory goods stocked in the center. Each company can know the inventory of collected machines to take back, base by base.

5. Preparation for Machine Take-Back

To take back collected machines of the local company from the exchange center 300, the person in charge of machine collection in each company reads the collected-machine inventory report F05 electrically sent from the exchange center 300 and addressed to the person from the data base 540. The person in charge settles on a take-back plan based on the inventory report F05 (step S226 in FIG. 28). Next, the person in charge creates a take-back request F06 as shown in FIG. 34 based on the settled take-back plan and sends the take-back request F06 to the exchange center 300 (step S226).

To creates this take-back request F06, the person in charge accesses the application server 530 and performs a log-in process. At this time, the person in charge enters the branch number of the local sales office. The application server 530 displays the process selection screen shown in FIG. 17 on the user terminal 110. The person in charge of machine collection selects "Arrangement for receiving collected machines of our company" on the process selection screen.

In response to this operation, the application server 530 generates a "collected-machine take-back request" input screen shown in FIG. 35 and sends the input screen to the user terminal 110.

On the screen, the company code is a company code used at the log-in time, and the take-back company name is a company name corresponding to the company code. The requestee is preset information, such as the name and address of the exchange center 300. The distribution means selects whether the take-back company executes distribution "itself" or requests the exchange center 300 for delivery. The desired take-back/delivery date is the desired date where the take-back process is performed. The take-back dealer is information on the dealer who performs a job of actually taking back collected machines from the collection center, and is arbitrarily selected from preset plural candidates. The distribution destination is the address or the like of the preset distribution destination. For example, there may be a case where the address of the station in charge of the collection work differs from the address of the station in charge of a work of processing collected machines. In such a case, the distribution destination may differ from the take-out company. The inventory list is a list of the inventory of the collected machines of the take-back entity is the company thereof.

The person in charge puts a check mark "X" on those collected machines in the collected-machine inventory list which are scheduled to be taken back this time. The person in charge inputs the branch number of the department which actually does the take-back operation into the branch input column.

When the input is completed and the "Send" button is clicked, the input contents are sent to the application server 530. The application server 530 produces, from the transmitted input information, a confirmation screen for allowing a user to check the input contents and sends the screen to the user terminal 110 to display it.

When the operator checks the input contents and finds that the input contents are correct, the operator clicks the "Set" button. In response to the clicking operation, the application server 530 creates the take-back request F06 based on the input contents, registers the take-back request F06 in the data base 540 and sends the request F06 to the exchange center 300.

The exchange center 300 receives the take-back request F06 from the sales office of each company and prepares for delivery based on the take-back request F06 (step S227). The exchange center 300 makes a delivery plan for the collected machines (step S228) and executes a delivery process according to the plan.

When actually perform the delivery process (delivering collected machines), the person in charge of the exchange center 300 registers the collected-machine transporting achievement.

To make this registration, the person in charge of the exchange center 300 accesses the application server 530 and performs a log-in process. If authentication passes, the application server 530 displays the process selection screen on the exchange center terminal 420.

The person in charge of the exchange center 300 selects "Registration for delivery" on the process selection screen. In response to this operation, the application server 530 discriminates those of "take-back request" F06 registered in the memory area for the exchange center 300 which include items whose achievements are unregistered, generates a list of the requests and sends the list to the exchange center terminal 420.

The person in charge of the exchange center 300 selects an arbitrary "take-back request". The application server 530 reads the selected "take-back request". Subsequently, the application server 530 extracts information on collected machines whose take-back achievements are not registered, synthesizes a screen for registration for take-back achievements, and sends the screen to the exchange center terminal 420.

The person in charge puts a check mark "X" on those of the collected machines in the list displayed on the exchange center terminal 420 which have actually transported this time, and designates the actual transporting date. When the person in charge completes the input and clicks the "Set" button, the input contents are sent to the application server 530. The application server 530 generates, from the transmitted input information, a confirmation screen for allowing a user to check the input contents and sends the screen to the exchange center terminal 420 to display it.

When the operator checks the input contents and finds that the input contents are correct, the operator clicks the "Send" button. In response to this clicking operation, the application server 530 adds the actual transporting date to the data base 540. That is, the actual transporting date is registered in the column of "actual transporting date" in the collected-machine history data (FIG. 13C). Further, a flag indicating the take-back process having been done and the transporting date (the date may be set as a flag) are registered for each collected machine on each take-back request.

In this manner, a series of information (collected-machine history information) from the schedule of transportation of collected machines to each exchange center 300 to the shipping achievement is stored in the data base 540.

6. Monthly Report

The person in charge of the main office of the operational business entity at the exchange center 300 creates a monthly report at a predetermined closing date every month (step S229).

In this case, by manipulating the control terminal 430, the person in charge accesses the application server 530, performs a log-in process and reads the process selection screen shown in FIG. 17. The person in charge clicks "Making month achievement report" on the process selection screen.

Then, the application server 530 inquires whether it is a monthly report for each exchange center 300 or a monthly report for the whole exchange centers 300. When "For each exchange center" is selected, the application server 530 searches exchange-center history data of each exchange center area in the data base 540 to acquire, for each collected-machine maker, information, such as the actual quantity of machines brought in this month, the quantity of machines to be stored and taken back this month (total: center, depot), the quantity of machines carried over from the previous month, the quantity of machines stored this month, the quantity of machines taken back this month, the quantity of inventory goods at the end of this month, the shipping ratio this month, the average number of storing days, the details for each size and the carry-in achievement in the collection depot, and synthesizes and displays a screen with those information as a list. The person in charge checks the screen and writes a memo in text if there is an operational problem or something to inform.

When "All" is selected, the application server 530 totals information of all the exchange centers, acquires, for each collected-machine maker, information, such as the actual quantity of machines brought in this month, the quantity of machines to be stored and taken back this month (total: center, depot), the quantity of machines carried over from the previous month, the quantity of machines stored this month, the quantity of machines taken back this month and the quantity of inventory goods at the end of this month, synthesizes a screen with those information as a list, and displays the screen on the control terminal 430. The person in charge checks the screen and writes a memo in text if there is something to inform.

When the input is completed and the "Register" button is clicked, the input contents are sent to the application server 530. The application server 530 produces, from the transmitted information, a confirmation screen for allowing a user to check the input contents and sends the screen to the control terminal 430 to display it. When the operator checks the input contents and finds that the input contents are correct, the operator clicks the "Confirm" button. In response to the clicking operation, the application server 530 registers the contents of the monthly report in the data base 540.

The application server 530 sends the generated monthly report for each exchange center and the monthly report for the whole exchange centers to each preregistered company. It is to be noted however that information only associated with that company is registered. For example, information, such as the actual quantity of machines brought in each exchange center this month, the quantity of machines to be stored and taken back this month (total: center, depot), the quantity of machines carried over from the previous month, the quantity of machines stored this month, the quantity of machines taken back this month and the quantity of inventory goods at the end of this month with respect to collected machines of the company A to be collected, and information, such as the actual quantity of machines brought in all the exchange centers this month, the quantity of machines to be stored and taken back this month, the quantity of machines carried over from the previous month, the quantity of machines stored this month, the quantity of machines taken back this month and the quantity of inventory goods at the end of this month with respect to collected machines of the company A for the entire exchange centers, are reported to the company A.

7. Making Bill

The person in charge of the operational company system 400 issues bills, for example, monthly (step S230 in FIG. 28).

For this action, by manipulating the control terminal 430, the person in charge accesses the application server 530 to log in and read the process selection screen shown in FIG. 17. The person in charge clicks "Totaling of bill data" on the process selection screen. In response to this operation, the application server 530 inquires whether it is a monthly report for each exchange center or a monthly report for the whole exchange centers.

When the person in charge selects "For each exchange center", the application server 530 searches the data base 540 to acquire, for each collected-machine maker, information, such as the actual quantity of machines brought in each collection depot, the actual quantity of collected machines, the unit price (collecting, stocking fee, transporting fee), the carry-in fee for this month, the collection fee for this month and the amount billed this month.

The fee that is generated in the exchange center 300 includes the number of delivered machines this month, the unit price (storage and shipment fees, management fee), the average stocking days, the stocking fee per day and the bill for this month.

The expense for the incidental work is acquired based on information on the incidental work at the time the storage achievement is registered. For example, fees for checking the machine number, checking the machine counter, the remove/detach of parts, the collection work, the delivery work, the collecting and transporting work, etc. are acquired.

The application server 530 generates a bill and a bill document for each company from the fees that have been obtained in the above manner.

The application server 530 electrically sends the generated bill and bill document to each company. In case where a bill should be sent as a printout by mail or the like due to requirements by law, the collection depot terminal 410 prints the bills and sends them to the individual companies by mail or the like.

8. Analysis of Achievement Data

The data base 540 sends the monthly report for each center and the monthly report for the whole exchange centers, registered in the above-described manner, to each preregistered company. It is to be noted however that information only associated with that company is registered For example, information, such as the actual quantity of machines brought in each exchange center this month, the quantity of machines to be stored and taken back this month (total: center, depot), the quantity of machines carried over from the previous month, the quantity of machines stored this month, the quantity of machines taken back this month and the quantity of inventory goods at the end of this month with respect to machines of the company A to be collected, and information, such as the actual quantity of machines brought in all the individual exchange centers this month, the quantity of machines to be stored and taken back this month (total: center, depot), the quantity of machines carried over from the previous month, the quantity of machines stored this month, the quantity of machines taken back this month and the quantity of inventory goods at the end of this month with respect to machines of the company A for the entire exchange centers, are reported to the company A.

As described above, the second embodiment, like the first embodiment, allows each maker 10 to easily collect used copying machines manufactured by itself.

The roles of the collection depot and the exchange center that have been described in the foregoing description of the second embodiment are just illustrative and not restrictive. For example, the collection depot may count the value of the counter (the number of prints) of a copying machine and register the count value in the data base 540, or may register the size of the machine in the data base 540.

In the embodiments, each of plural makers 10 who manufacture copying machines brings copying machines of the other makers that have been collected from the business entity 30 into the exchange center 20 and picks up its own copying machines from the exchange center 20. Alternatively, a person who brings copying machines into the exchange center 300 may be a dealer who deals with products of plural makers and independent of the individual makers 10 and a person who picks up copying machines from the exchange center 20 may be a recycler independent of the individual makers 10.

That is, the manufacturer of products and the collector (take-back entity) should not necessarily coincide with each other completely but have only to substantially match with each other. For example, the manufacturing company may be A while the take-back entity may be a subsidiary company E which specializes in machine collection and does the work on behalf of the manufacturing company A according to a predetermined contract, or a company F which specializes in machine collection and does the work on behalf of the manufacturing company A.

The foregoing description of the embodiment has been given of the goods collection assisting system that is designed to ensure smooth exchange of used copying machines in order to efficiently recycle used copying machines among plural makers. However, products whose take-back process is to be assisted are not limited to copying machines in the invention, but can by industrial goods which at least partly include reusable or recyclable parts. The invention are particularly advantageous in a case where the invention is adapted to relatively large industrial goods, such as copying machines.

For example, the invention can also be adapted to various office machines, such as a printer, a facsimile and a telephone, electric home appliances, such as TV, a washing machine, a refrigerator, an air-conditioning system, a video tape recorder, a stereo system and a cassette tape recorder, and industrial machines, such as a network device, an automobile, a vehicle, a vessel, a furniture, construction machines, machine tools and manufacturing equipment.

In this case, exchange centers (or collection depots+exchange centers) may be prepared for each type of goods to be exchanged. Contrary, storage and exchange of plural types of goods and products may be carried out by a single exchange center (or a collection depot and an exchange center).

In this case, if the portion that is equivalent to the "product name" described in the foregoing description of the embodiments is set to a "product category" and "product name", it is easier for the operator to specify goods to be exchanged.

Further, the charging scheme is arbitrary. For example, the fees can be set in such a way as to charge by the number of machines per day, regardless of the sizes.

The system structures of the operational company system 400 and the server system 500 and the structures of data that is processed in both can be altered and modified arbitrarily.

For example, according to the second embodiment, data with the structure as shown in FIG. 13B is stored in the collation depot area in the data base 540 and data with the structure as shown in FIG. 13B is stored in the exchange center area. However, the collection depot 200 and the exchange center 300 can share data shown in FIG. 13C. For example, when a carry-in request is given to the collection depot 200, an area for storing the data shown in FIG. 13C is secured in the data base 540. Next, data newly generated as the processing progresses is written in the area one after another. This structure can ensure the efficient use of the data base 540.

Although the collection depot terminal 410, the exchange center terminal 420 and the control terminal 430 belong to a single operational company, they may be provided in separate operational companies. Further, the operational company of each collection depot may differ from the operational company of each exchange center. In this case, for example, the collection depot terminal 410, the exchange center terminal 420 and the control terminal 430 are also connected to the server system 500 via the authentication system 510.

The program which controls a computer or computers to operates as the server or terminal to execute the process illustrated may be distributed in the form of a computer-readable recording medium, such as a CD-ROM or DVD, where the program is stored. As the program recorded in such a recording medium is executed by a general-purpose computer, the functions of the exchange assisting system 200 are achieved. Further, the program may be stored in a hard disk unit installed in a Web server on the Internet and may be down-loaded to a general-purpose computer which is connected to the Web server via the Internet.

As described above, the invention can effectively use these disused and collected products as resources.

This application is based on Japanese Patent Applications Nos. 2000-402196 and 2001-401258 and including specification, claims, drawings and summary. The disclosure of the above Japanese Patent Applications are incorporated herein by reference in its entirely.

What is claimed is:

1. A goods collection assisting method of assisting each of a plurality of business entities to exchange collected used goods of other of the business entities with said other of the business entities and to take back used goods each respective business entity wants to take back, comprising:

a collected goods information input step of inputting collected goods information representing collected goods to be stored in a predetermined storage place;

an information processing step, implemented by a processor, of storing said collected goods information input from said collected goods information input step into a memory, processing said stored collected goods information, preparing stored goods information indicating collected goods to be taken back by each of said plurality of business entities and notifying each business entity of said stored goods information;

a receiver information processing step of receiving and outputting said stored goods information from said information processing step, and inputting desired goods-to-take-back information associated with collected goods each business entity wants to take back and that is prepared based on said stored goods information; and a keeper information processing step of receiving and outputting said desired goods-to-take-back information input from said receiver information processing step;

wherein the information about said collected goods includes information for specifying a manufacturer of said collected goods, and an achievement report preparing step of preparing, for each of the manufacturers, a report indicating achievement of collection and exchange of the goods manufactured by the respective manufacturer, and sending the prepared reports to the respective business entity relating to the manufacturer, each of the reports including only information relating to the respective manufacturer; and said information processing step includes classifying said collected goods by manufacturer and preparing said stored goods information based on that classification, and notifying each respective business entity of the stored goods information relating to the collected goods of any specific manufacturer which the respective business entity wants to take back.

2. The goods collection assisting method according to claim 1, wherein said collected goods information input step includes a desired goods-to-bring-in information input step of inputting desired goods-to-bring-in information about said goods each business entity wants to bring in before said each business entity brings collected goods to be stored in said predetermined storage place, and the step of inputting information further indicates that said collected goods have been brought in when said collected goods have been brought to be stored in said predetermined storage place.

3. The goods collection assisting method according to claim 2, further comprising a step of outputting said desired goods-to-bring-in information to be ready for reception at said predetermined storage place.

4. The goods collection assisting method according to claim 1, wherein said keeper information processing step receives said desired goods-to-take-back information via said information processing system.

5. The goods collection assisting method according to claim 4, wherein said information processing step excludes from said collected goods information those collected goods which are specified by said desired goods-to-take-back information as desired goods to be taken back.

6. The goods collection assisting method according to claim 1, wherein said keeper information processing step outputs said desired goods-to-take-back information to be ready for shipment from said predetermined storage place.

7. The goods collection assisting method according to claim 1, wherein said keeper information processing step inputs shipment information indicating collected goods which have been shipped out of said predetermined storage place, and said information processing step stores said shipment information from said keeper information processing step in association with said stored collected goods information and excludes said shipped collected goods from said stored goods information.

8. The goods collection assisting method according to claim 1, wherein said predetermined storage place includes plural first storage places and plural second storage places, each of the first storage places receives collected goods collected by said business entities, and each of the second storage places is provided for a plurality of said first storage places and stocks said collected goods transferred from the first storage places, and said information processing step stores, for individual collected goods, information including those business entities which have collected said individual collected goods, those business entities which are to take back said individual collected goods, information specifying said individual collected goods, a scheduled reception date of receiving said individual collected goods in said first storage places, a reception date at which said individual collected goods have been received in said first storage places, a scheduled transporting date of transporting said individual collected goods to said second storage places from said first storage places, a scheduled delivering-out date of delivering said individual collected goods to individual business entities from said second storage places, and a delivering-out date at which said individual collected goods have been delivered to individual business entities from said second storage places.

9. The goods collection assisting method according to claim 8, wherein an achievement report preparing step prepares the reports of each of the first and second storage places and a report of whole of the goods collection assisting system.

10. The goods collection assisting method according to claim 1, wherein said information processing step executes a charging process of charging each business entity for storage and exchange works based on at least a quantity and a storage period of collected goods stored in said predetermined storage place.

11. The goods collection assisting method according to claim 1, wherein for each of said collected goods, said information processing system stores at least one of a scheduled date of delivery into said predetermined storage place, an actual delivering-in date, a collecting business entity, a taking-back business entity, information specifying goods, a scheduled delivering-out date, and an actual delivering-out date.

12. The goods collection assisting method according to claim 1, wherein said information processing step prepares said stored goods information every given predetermined time period and sends said stored goods information to each business entity.

13. A goods collection assisting method which assists each of a plurality of business entities to exchange collected used goods of other of the business entities with said other of the business entities and to take back used goods each respective business entity wants to take back, and which comprises:

a step of storing, by a memory unit, collected goods information representing collected goods to be stored in a predetermined storage place;

a step of processing, by a processor, said collected goods information stored in said memory unit to prepare stored goods information to be referred to by said plurality of business entities to take back collected goods; and a step of receiving desired goods-to-take-back information prepared based on said stored goods information and associated with collected goods each business entity wants to take back; and an achievement report preparing step of preparing, for each of the manufacturers, a report indicating achievement of collection and exchange of the goods manufactured by the respective manufacturer, and sending the prepared reports to the respective business entity relating to the manufacturer, each of the reports including only information relating to the respective manufacturer;

wherein the collected goods information includes information for specifying a manufacturer of said collected goods, and said step of processing includes classifying said collected goods by manufacturer, preparing said stored goods information based on that classification, and notifying each respective business entity of the stored goods information relating to the collected goods of any specific manufacturer which the respective business entity wants to take back.

14. The goods collection assisting method according to claim 13, further comprising steps of:

accepting and storing schedule information indicating a scheduled storing date in said memory unit before said each business entity brings used goods in said predetermined storage place;

accepting storage information indicating an actual date of receiving said collected goods in said predetermined storage place and storing said storage information in said memory unit in association with said storing schedule information;

storing a desired taking-back date, included in said desired goods-to-take-back information, in said memory unit in association with said storage information; and accepting delivering-out information indicating an actual date of delivery out of said predetermined storage place and storing said delivering-out information in said memory unit in association with said desired taking-back date.

15. The goods collection assisting method according to claim 13, wherein said predetermined storage place includes plural first storage places and plural second storage places, each of the first storage places receives collected goods collected by said business entities, and each of the second storage places is provided for a plurality of said first storage places and stocks said collected goods transferred from the first storage places, and said memory unit stores in the memory unit information indicating a delivering-in date of delivery of said collected goods into said first storage places, a delivering-in date of delivery of said collected goods into said second storage place and a delivering-out date of carrying said collected goods out of said second storage place to an associated business entity.

16. The goods collection assisting method according to claim 15, wherein an achievement report preparing step prepares the reports of each of the first and second storage places and a report of whole of the goods collection assisting system.

17. The goods collection assisting method according to claim 13, further comprising a charging step of charging each business entity for storage and exchanging works based on at least a quantity and a storage period of collected goods for each taking-back business entity.

18. An information processing method for goods collection assistance, which assists each of a plurality of business entities to exchange collected used goods of other of the business entities with said other of the business entities and to take back used goods each respective business entity wants to take back, and which comprises:

a step of receiving a schedule of bringing collected goods into a predetermined storage place from a control information processing system, including a processor, for controlling collected goods and outputting said schedule;

a step of sending storage information of said collected goods brought in said predetermined storage place to said control information processing system, and an achievement report preparing step of preparing, for each of the manufacturers, a report indicating achievement of collection and exchange of the goods manufactured by the respective manufacturer, and sending the prepared reports to the respective business entity relating to the manufacturer, each of the reports including only information relating to the respective manufacturer;

a step of notifying each tacking-back business entity of the storage information and receiving and outputting desired goods-to-take-back information about used goods each taking-back business entity wants to take back via said control information processing system; and a step of sending information indicating goods delivery out of said predetermined storage place to said control information processing system;

wherein the storage information includes information for specifying goods and manufacturers of the goods, said step of notifying and receiving includes classifying said goods brought by manufacturer, and preparing said storage information based on that classification and notifying each respective business entity of the storage information relating brought goods of any specific manufacturer which the respective take-back business entity wants to take back.

* * * * *